US012715289B2

(12) United States Patent
Xu et al.

(10) Patent No.: US 12,715,289 B2
(45) Date of Patent: Aug. 25, 2026

(54) IMAGE SOURCE, DISPLAY DEVICE, HEAD UP DISPLAY APPARATUS AND TRANSPORTATION EQUIPMENT

(71) Applicant: FUTURUS TECHNOLOGY CO., LTD., Beijing (CN)

(72) Inventors: Junfeng Xu, Beijing (CN); Huijun Wu, Beijing (CN)

(73) Assignee: FUTURUS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/998,827

(22) PCT Filed: Jul. 28, 2023

(86) PCT No.: PCT/CN2023/109899

§ 371 (c)(1),
(2) Date: Jan. 27, 2025

(87) PCT Pub. No.: WO2024/022506

PCT Pub. Date: Feb. 1, 2024

(65) Prior Publication Data

US 2026/0042349 A1 Feb. 12, 2026

(30) Foreign Application Priority Data

Jul. 28, 2022 (CN) ........................ 202221974800.X
Jul. 28, 2022 (CN) ........................ 202221974843.8
(Continued)

(51) Int. Cl.

| | |
|---|---|
| ***B60K 35/22*** | (2024.01) |
| ***B60K 35/23*** | (2024.01) |
| ***G02B 27/01*** | (2006.01) |

(52) U.S. Cl.
CPC .............. *B60K 35/23* (2024.01); *B60K 35/22* (2024.01); *G02B 27/0101* (2013.01); *G02B 2027/0134* (2013.01); *G02B 2027/0185* (2013.01)

(58) Field of Classification Search
CPC .... B60K 35/22; B60K 35/23; G02B 27/0101; G02B 2027/0134; G02B 2027/0185
See application file for complete search history.

(56) References Cited

U.S. PATENT DOCUMENTS

2013/0265646 A1 10/2013 Sakai
2017/0336628 A1* 11/2017 Kim ...................... B60K 35/60
(Continued)

FOREIGN PATENT DOCUMENTS

CN 1246925 A 3/2000
CN 102914870 A 2/2013
(Continued)

OTHER PUBLICATIONS

Extended European Search Report in European Application No. 23845710.5 dated Sep. 11, 2025.
(Continued)

*Primary Examiner* — Ryan A Lubit
(74) *Attorney, Agent, or Firm* — Dilworth & Barrese. LLP.; Michael J. Musella, Esq.

(57) ABSTRACT

An image source, a display device, a head up display apparatus and a transportation equipment are disclosed. In the display device, the refractor is on a light exiting side of the image source component and changes an optical distance of the image light, so as to change the imaging distance of a virtual image formed by the image light; the processing portion is on a light exiting side of the refractor and reflects the image light to form the virtual image. The image source component includes a light modulation layer, the light
(Continued)

modulation layer converts the incident light-source light into image light and emits the image light from the light exiting surface of the image source; the light compensation component causes the light-source light to be incident into different positions of the light incident surface of the light modulation layer with a refraction angle.

17 Claims, 11 Drawing Sheets

(30) Foreign Application Priority Data

Dec. 30, 2022 (CN) ........................ 202211730145.8
Dec. 30, 2022 (CN) ........................ 202211735407.X

(56) References Cited

U.S. PATENT DOCUMENTS

2018/0270455 A1 9/2018 Furuya
2018/0284434 A1* 10/2018 Ogata ................ G03B 21/2033
2019/0049854 A1* 2/2019 Qu ...................... G03F 7/70358
2019/0162960 A1* 5/2019 Harada .............. G02B 27/0101
2019/0339518 A1 11/2019 Zandén et al.
2023/0017795 A1* 1/2023 Seder ..................... B60K 35/23

FOREIGN PATENT DOCUMENTS

CN 107390475 A 11/2017
CN 107422477 A 12/2017
CN 210348060 U 4/2020
CN 112639581 A 4/2021
CN 213240680 U 5/2021
CN 113031264 A 6/2021
CN 113296266 A 8/2021
CN 114077053 A 2/2022
CN 116381947 A 7/2023
CN 116413906 A 7/2023
CN 116413907 A 7/2023
CN 116413908 A 7/2023
DE 102016218582 A1 3/2018
JP 01092718 A 4/1989
JP 2008195194 A 8/2008
JP 2014010418 A 1/2014
JP 2014164066 A 9/2014
JP 2015146011 A 8/2015
JP 2017219755 A 12/2017
JP 2018086900 A 6/2018
JP 2020126101 A 8/2020
KR 20210060183 A 5/2021
WO 2016136407 A1 9/2016
WO 2018229961 A1 12/2018
WO 2020032095 A1 2/2020
WO 2022085621 A1 4/2022
WO 2022131137 A1 6/2022
WO 2023123338 A1 7/2023

OTHER PUBLICATIONS

Japanese First Office Action in Application No. 2025-504776; Mailing Date: Mar. 24, 2026.

* cited by examiner

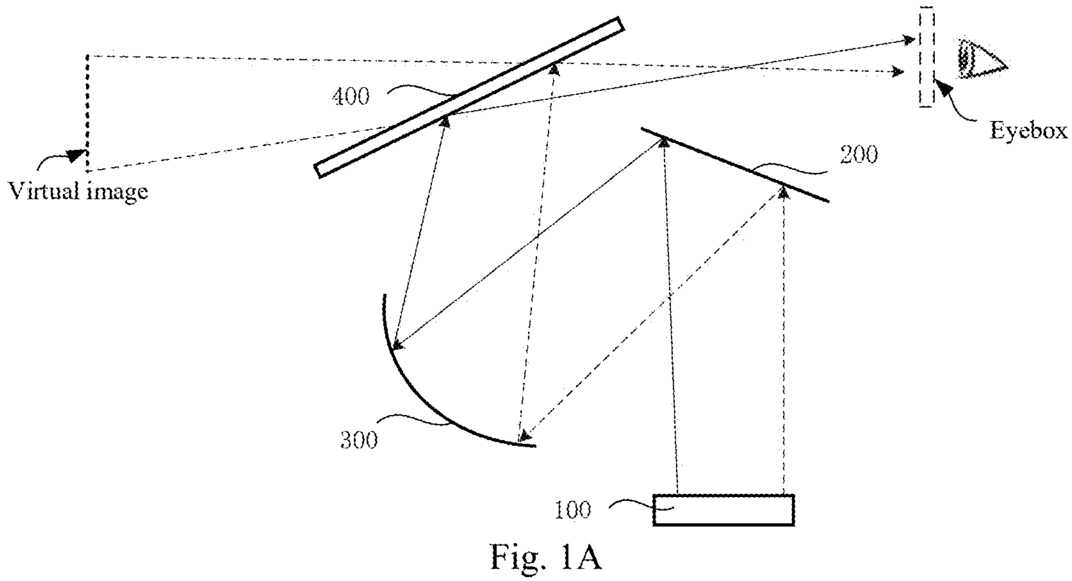
Fig. 1A
Fig. 1B
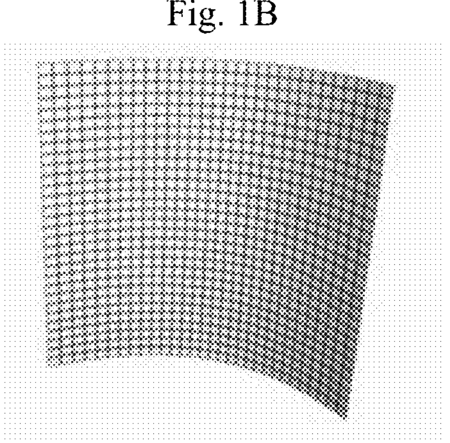
Fig. 1C

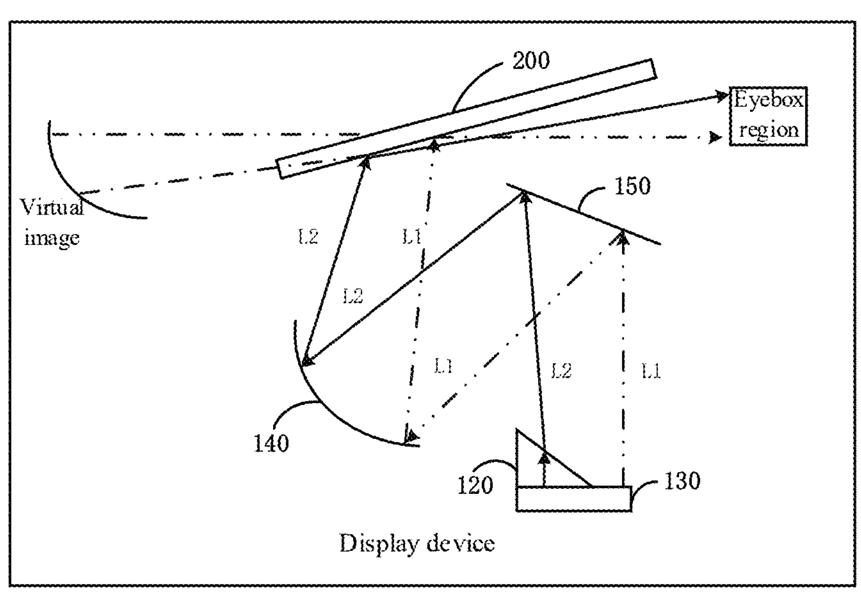
Fig. 1D
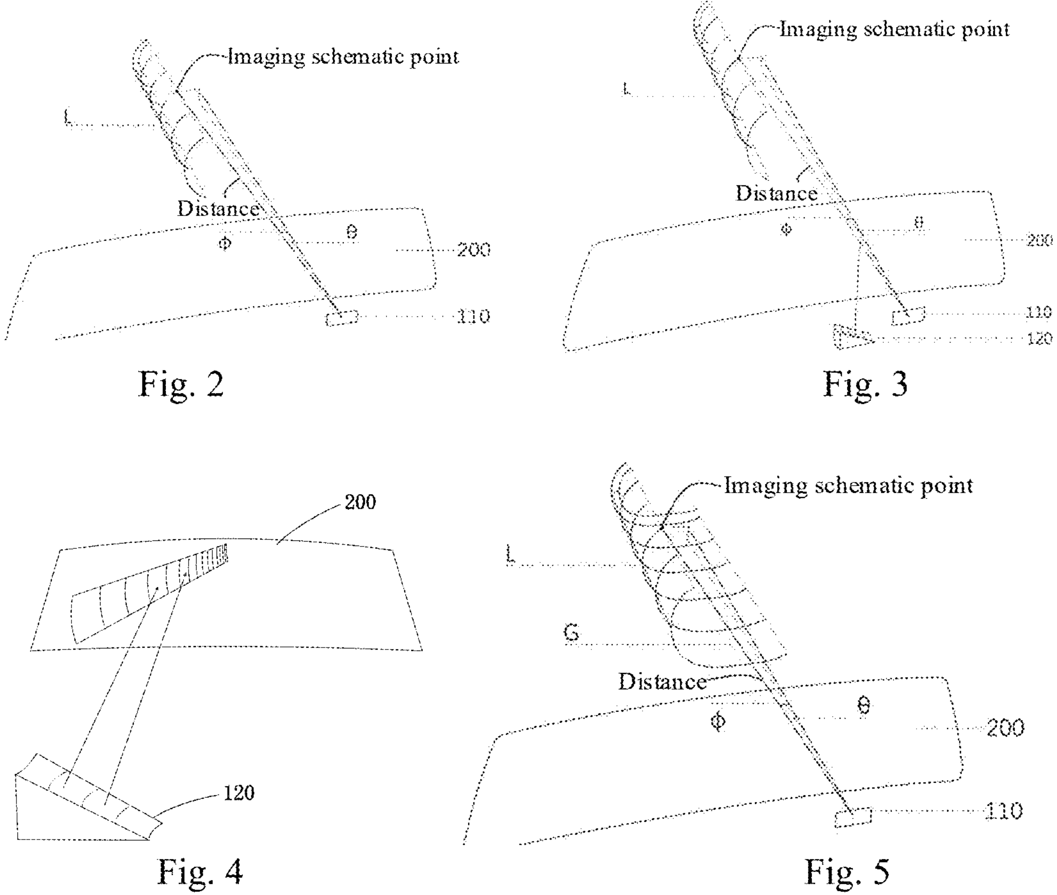
Fig. 2
Fig. 3
Fig. 4
Fig. 5

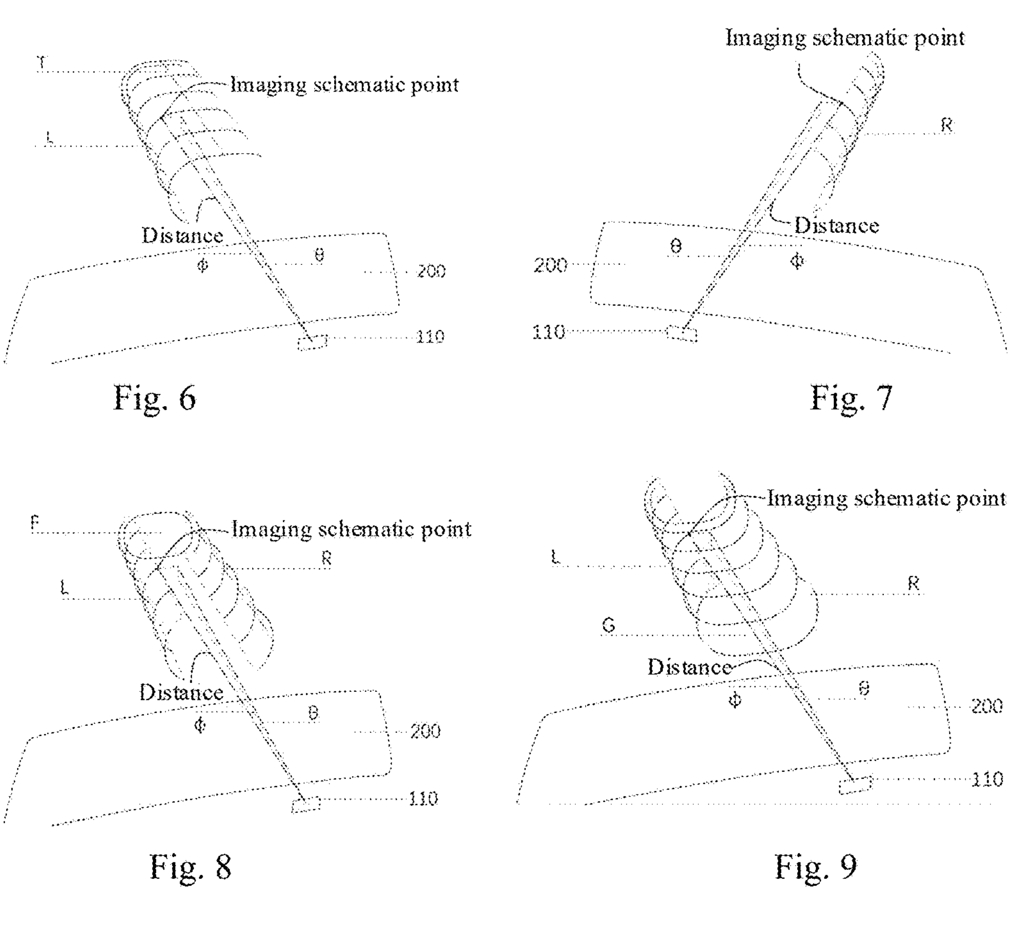
Fig. 6
Fig. 7
Fig. 8
Fig. 9
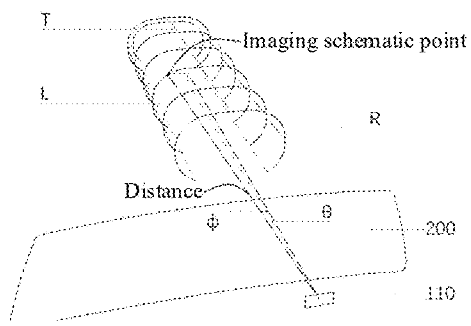
Fig. 10
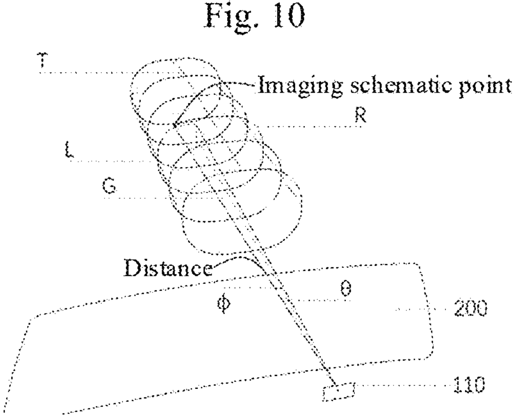
Fig. 11

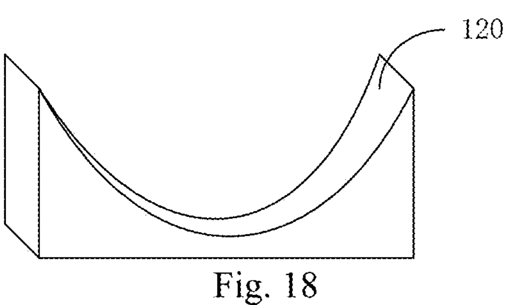
Fig. 18
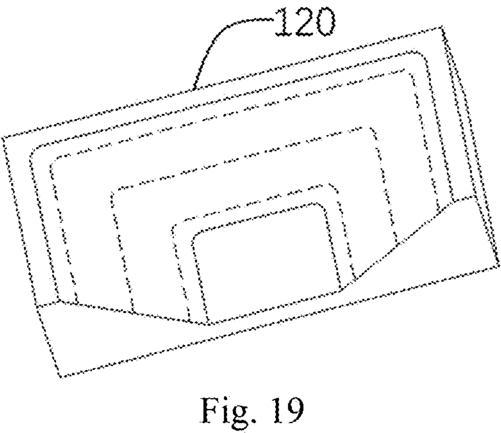
Fig. 19
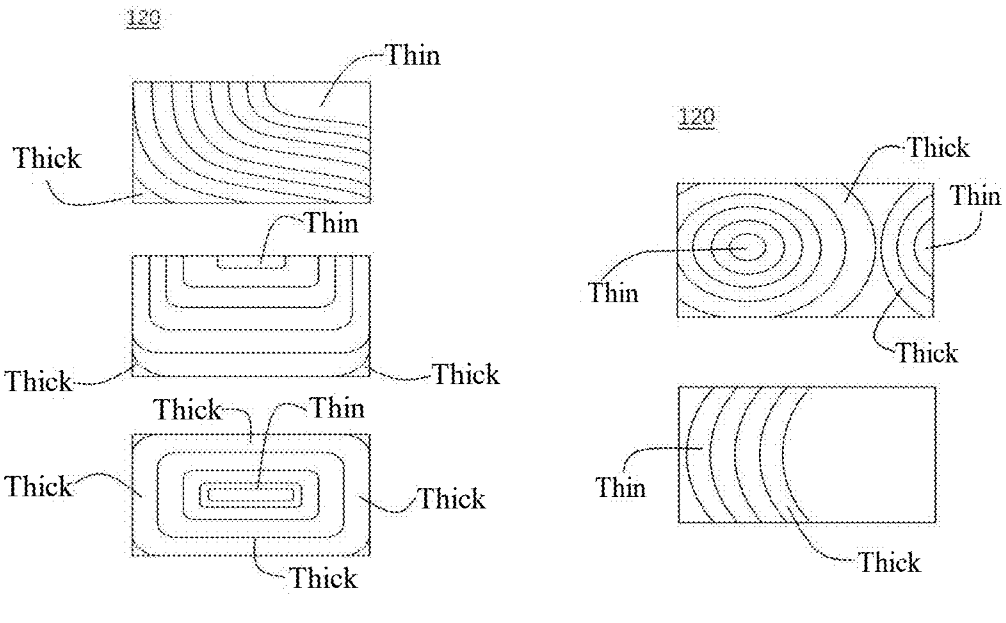
Fig. 20
Fig. 21

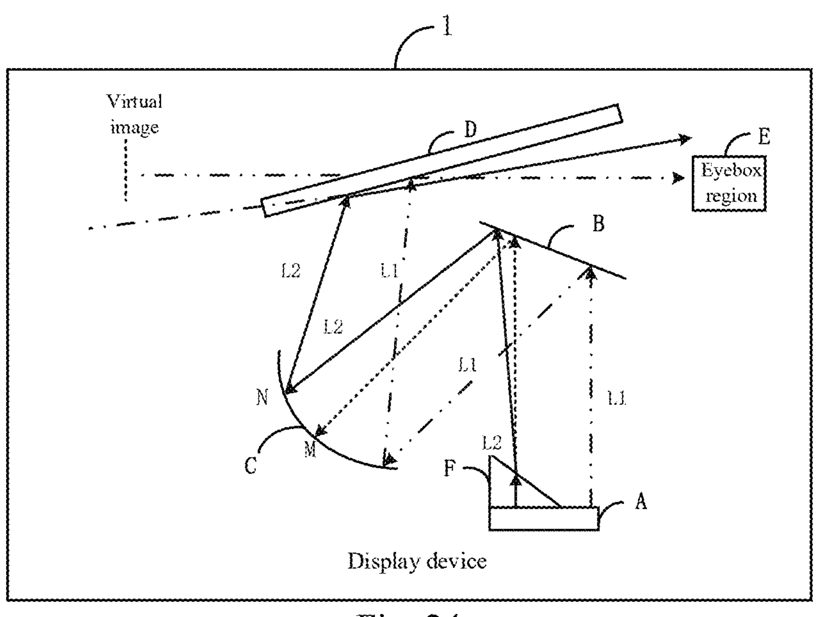
Fig. 24
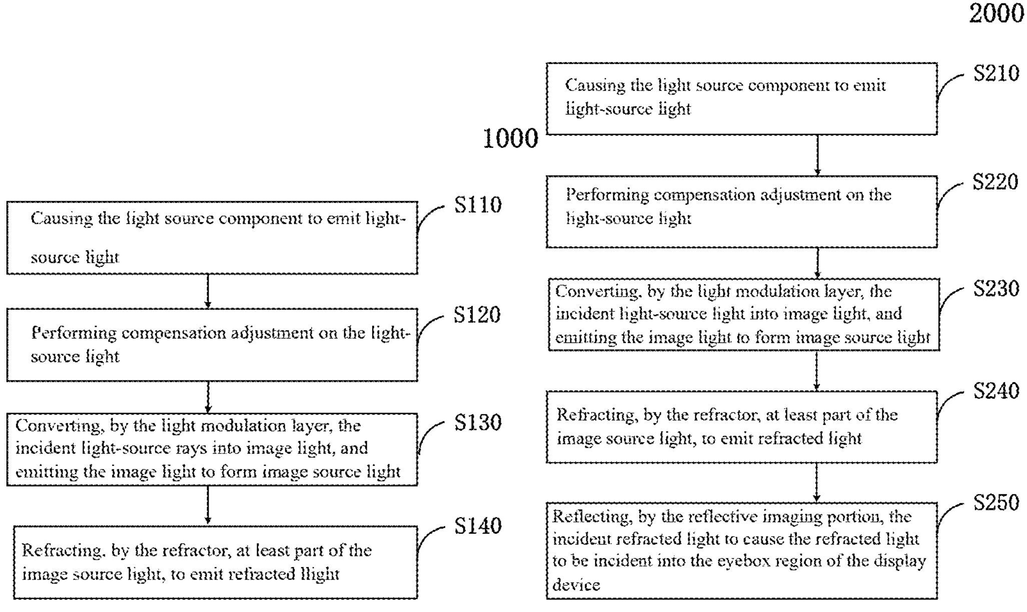
Fig. 25
Fig. 26

IMAGE SOURCE, DISPLAY DEVICE, HEAD UP DISPLAY APPARATUS AND TRANSPORTATION EQUIPMENT

The application claims priority to the Chinese patent application No. 202211730145.8 filed on Dec. 30, 2022, the Chinese patent application No. 202211735407.X filed on Dec. 30, 2022, the Chinese patent application No. 202221974800.X filed on Jul. 28, 2022, and the Chinese patent application No. 202221974843.8 filed on Jul. 28, 2022, the entire disclosure of which are incorporated herein by reference as part of the present application.

TECHNICAL FIELD

At least one embodiment of the present disclosure relates to an image source, a display device, a head up display apparatus and a transportation equipment.

BACKGROUND

Head up display (HUD) is a technology in which light emitted by the image source is finally projected onto an imaging window (an imaging board or a windshield) through a reflective optical design, so that a user may directly see a virtual image generated by a head up display without having to lower the head. For example, the head up display can prevent a driver from being distracted by looking down at a dashboard in a driving process, which improves a driving safety coefficient, and at the same time, provides better driving experience.

AR-HUD is a combination of augmented reality (AR) technology and head up display (HUD), which possesses a larger field of view and a longer imaging distance, aiming to directly overlay a virtual image onto a real scene. However, in the case where a virtual imaging distance (VID) of the virtual image generated by AR-HUD does not match the real scene, a visual focus of the user may switch between the real scene and the virtual image, resulting in visual fatigue.

As affected by various factors such as curvatures of lane lines, changes in vehicle orientations, positions of obstacles, and appearances of real scenes, the virtual image is difficult to be fitted to the real scene; and an imaging plane of the virtual image generated by HUD needs to be adjusted, to form curved imaging planes according to different real scenes, so that a part of the virtual image can possess different imaging distances, thereby achieving an effect more fitted to the real scene.

The content of the background section is only the technology known to an inventor of the present disclosure and does not represent the existing technology in the art.

SUMMARY

At least one embodiment of the present disclosure provides an image source, and the image source comprises an image source component, a refractor, and a processing portion. The image source component is configured to emit image light; the refractor is arranged on a light exiting side of the image source component, and is configured to change an optical distance of at least a part of the image light, so as to change an imaging distance of at least a part of a virtual image formed by the image light; and the processing portion is arranged on a light exiting side of the refractor, and configured to enable at least part of the image light to propagate to the eyebox, and the at least part of the image light processed by the processing portion comprises refracted light formed by the image light which is emitted by the image source component and then emitted from the refractor.

At least one embodiment of the present disclosure further provides a display device comprising the image source provided by at least one embodiment of the present disclosure, that is, the display device provided by one embodiment of the present disclosure comprises an image source component, a refractor, and a processing portion. The image source component is configured to emit image light; the refractor is arranged on a light exiting side of the image source component, and is configured to change an optical distance of at least a part of the image light, so as to change an imaging distance of at least a part of a virtual image formed by the image light; and the processing portion is arranged on a light exiting side of the refractor, and configured to enable at least part of the image light to propagate to the eyebox, and the at least part of the image light processed by the processing portion comprises refracted light formed by the image light which is emitted by the image source component and then emitted from the refractor.

At least one embodiment of the present further disclosure provides an image source, and the image source comprises an image source component and a light compensation component, and the image source component comprises a light modulation layer; the light compensation component is configured to emit light-source light, the light-source light is incident into the light modulation layer, and the light modulation layer is configured to convert the incident light-source light into the image light, and cause the image light to be emitted from a light exiting surface of the image source, and the image light propagates to an eye box area to form a virtual image; the light compensation component is configured to cause the light-source light to be incident onto different positions of a light incident surface of the light modulation layer with at least one refraction angle; and the refraction angle is an included angle between the light-source light and a normal line of the light incident surface of the light modulation layer.

At least one embodiment of the present further disclosure provides a display device comprising any image source provided by at least one embodiment of the present disclosure. For example, the display device comprises the above-mentioned refractor and processing portion.

At least one embodiment of the present further disclosure provides a head up display apparatus which comprises the display device any image source provided by at least one embodiment of the present disclosure or any display device provided by at least one embodiment of the present disclosure.

At least one embodiment of the present further disclosure provides a transportation equipment which comprises the head up display apparatus provided by at least one embodiment of the present disclosure.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 1A shows a schematic diagram of a head up display;

FIG. 1B shows a schematic diagram of a head up display apparatus provided by an embodiment of the present disclosure;

FIG. 1C shows a schematic diagram of an imaging plane of a virtual image formed by a refractor;

FIG. 1D shows a structural schematic diagram of a display device provided by an embodiment of the present disclosure;

FIG. 2 to FIG. 13 show structural schematic diagrams of the refractor changing a plane type of imaging provided by an embodiment of the present disclosure;

FIG. 14 to FIG. 21 show structural schematic diagrams of the refractor provided by an embodiment of the present disclosure;

FIG. 24 shows a structural schematic diagram of a display device;

FIG. 25 shows a flow chart 1000 of a first light compensating method provided by an embodiment of the present disclosure;

FIG. 26 shows a flow chart 2000 of a second light compensating method provided by an embodiment of the present disclosure;

DETAILED DESCRIPTION

Figures 12, 13, 14, 15A, 15B, 16, 17:
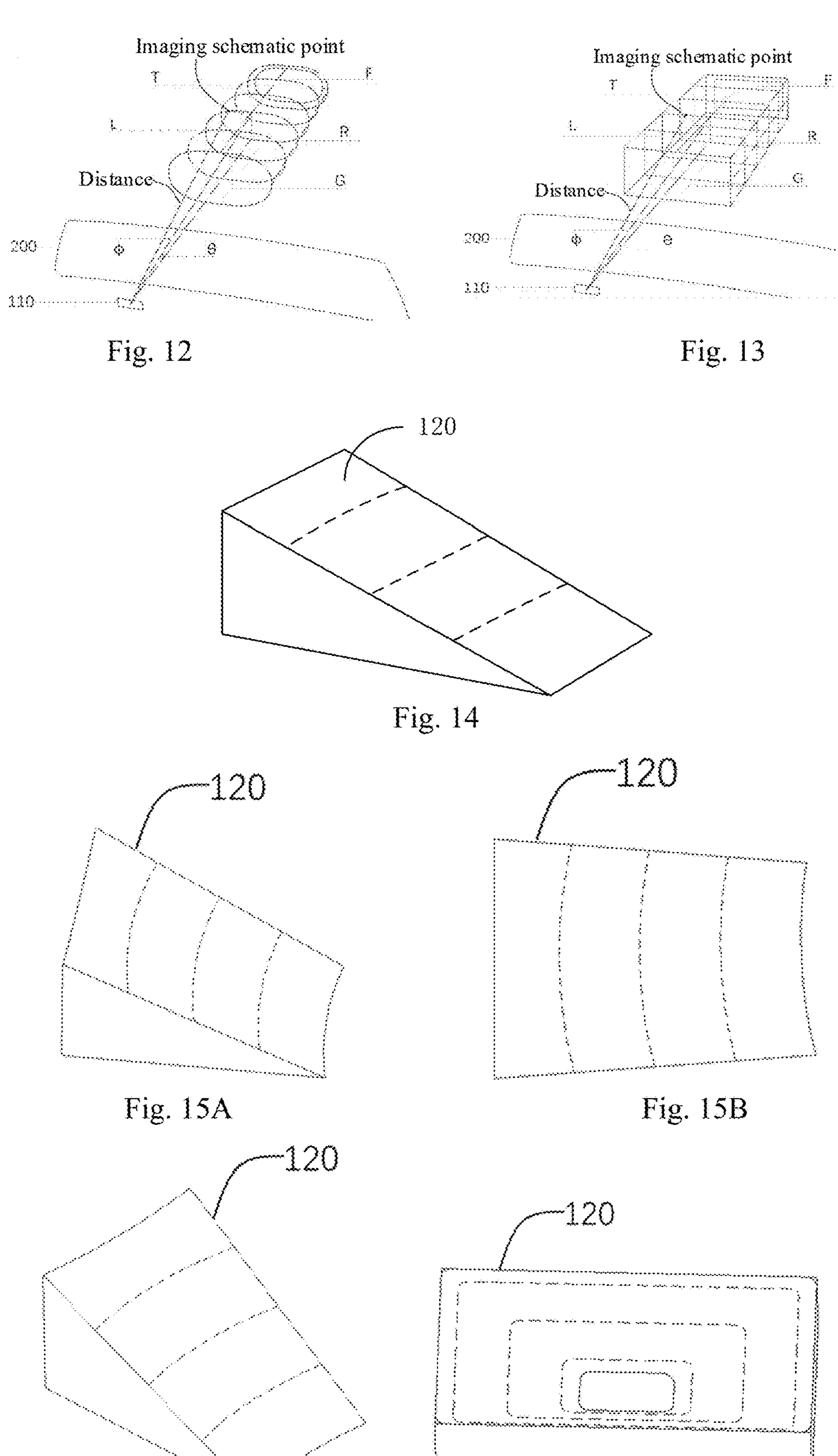

In order to make objects, technical details and advantages of the embodiments of the disclosure apparent, the technical solutions of the embodiments will be described in a clear and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms “first,” “second,” etc., which are used in the description and the claims of the present application for disclosure, are not intended to indicate any sequence, amount or importance, but distinguish various components. Also, the terms “comprise,” “comprising,” “comprise,” “comprising,” etc., are intended to specify that the elements or the objects stated before these terms encompass the elements or the objects and equivalents thereof listed after these terms, but do not preclude the other elements or objects. The phrases “connect”, “connected”, etc., are not intended to define a physical connection or mechanical connection, but may comprise an electrical connection, directly or indirectly. “On,” “under,” “left,” “right” and the like are only used to indicate relative position relationship, and when the position of the object which is described is changed, the relative position relationship may be changed accordingly.

It should also be understood that the terms used in the specification of the present disclosure are only for the objective of describing specific embodiments and are not intended to limit the present disclosure. As used in the specification and the claims of the present disclosure, unless otherwise clearly indicated in the context, singular forms of “a/an”, “one” and “the” are intended to include plural forms. It should be further understood that the term “and/or” used in the specification and the claims of the present disclosure refers to any combination of one or more of the listed items and all possible combinations, including these combinations.

Features such as “parallel”, “perpendicular” and “identical”, etc. used in the embodiments of the present disclosure all include strictly defined features such as “parallel”, “perpendicular” and “identical”, as well as cases where certain errors are included such as “substantially parallel”, “substantially perpendicular” and “substantially identical”, considering that errors related to measurement and measurement of a specific quantity (e.g., limitations of a measurement system) indicate that such features are within an acceptable deviation range for a specific value determined by those ordinarily skilled in the art. For example, the expression “substantially” may indicate that features are within one or more standard deviations, or within 10% or 5% of a value. When a quantity of a component is not specifically specified in the following text of the embodiments of the present disclosure, it means that the quantity of such component may be one or more, or may be understood as at least one. The expression “at least one” refers to one or more, and “more” refers to at least two.

The drawings in the present disclosure are not strictly drawn to actual proportions; the numbers of image sources and images in the display device are not limited to the numbers shown in the diagrams; and specific sizes and quantities of respective structures may be determined according to actual needs. The drawings described in the present disclosure are only schematic diagrams.

It should be noted that the sizes and proportional relationships of the elements in the drawings of the present disclosure, and the sizes of the geometric distances are only illustrative and are not limited to sizes and proportions of actual elements or sizes of the geometric distances. Specific lengths of the geometric distances should be understood in conjunction with textual description.

In the present disclosure, unless otherwise explicitly specified and limited, a first feature being located "above" or "below" a second feature may include the first feature and the second feature being in direct contact with each other, or may also include the first feature and the second feature being not in direct contact with each other, but being in contact with each other through an additional feature between them. Moreover, the first feature being "on", "above", and "over" the second feature includes the first feature being directly above and diagonally above the second feature, or simply indicates that the first feature is horizontally higher than the second feature. The first feature being "below", "under" and "beneath" the second feature includes the first feature being directly below and diagonally below the second feature, or simply indicates that the first feature is horizontally lower than the second feature.

Disclosure below provides many different implementations or examples for implementing different structures of the present disclosure. In order to simplify disclosure of the present disclosure, specific examples of components and arrangements are described below. Of course, they are only examples and are not intended to limit the present disclosure. In addition, the present disclosure may repeat reference numbers and/or reference letters in different examples for the objective of simplification and clarity, and such repetition does not indicate relationships between various implementations and/or arrangements discussed. In addition, the present disclosure provides various specific examples of processes and materials, but those ordinarily skilled in the art may be aware of application of other processes and/or use of other materials.

The term like "being visually fused with a real environment" refers to an image presented by the HUD that observer's eyes see through an eyebox being substantially fused with the real environment.

In some examples, to solve a problem of visual convergence (VAC), at least an embodiment of the present disclosure provides a display device, and the display device includes an image source component, a refractor and a processing portion; the image source component is configured to emit image light; the refractor is configured to refract the image light incident thereto to emit refracted light; and the processing portion is configured to cause the refracted light emitted from the refractor to propagate to an eyebox, so that user's eyes can receive the light when located inside the eyebox, to see the virtual image. By setting the refractor with a refractive index greater than 1, the optical distance of at least part of the image light can be changed, so as to change imaging distances of at least a part of region of the virtual image.

Of course, in some other examples, an image source of a preset shape (e.g., an image source of a curved surface) may be used for emitting image light, so that at least part of the image light has different optical distances, which further cause imaging distances from at least a part of region of the virtual image to the eyes gradually changes, thereby implementing gradual zoom of the virtual image.

The gradual zoom may be gradual zoom of the virtual image in one direction of a direction perpendicular to the ground and a direction parallel to the ground, or may also be gradual zoom of a combination of the above both directions, which is not be limited.

FIG. 1A shows a schematic diagram of a head up display. As shown in FIG. 1A, the head up display of the vehicle includes an image source component 100, a reflector 200 and a processing portion (e.g., the processing portion may include an amplifier component 300 and an imaging window 400), which form a complete light path. The image source component 100 is configured to emit image light, and the image light is reflected by the reflector 200, magnified by the amplifier component 300, and finally reflected by the imaging window 400 (e.g., a windshield) toward the user, entering the eyebox, so that the user may see the virtual image. The eyebox may be a region in which the user's eyes are located when viewing the virtual image generated by the HUD. Usually, in the design process of the HUD, a region is set to ensure that the user's eyes can see the virtual image generated by the HUD when located within this region.

If some contents corresponding to environmental objects, for example, an arrow indicating a roadside restaurant or an arrow indicating a turning direction at an intersection, etc., need to be exhibited in the virtual image, in the case where imaging positions of these contents match positions of real environmental objects, the user will have good visual experience. However, the inventor has found through study that virtual images formed by the existing HUD all are perpendicular to the road surface and have a fixed virtual imaging distance, as a result, such virtual images are hard to have the contents fuse well with the environmental objects at all times; for example, due to differences in curvatures of lane lines, changes in vehicle orientations, shapes of obstacles, etc., a virtual image with a single virtual imaging distance formed by the HUD is hard to be closely fitted to the real environment, resulting in problems such as parallax and visual convergence, which affects use experience of the user.

The reason for the parallax problem of the HUD is that: there is positional deviation between the virtual image and a corresponding environmental object, so that the position of the virtual image seen by at least one of the left eye and the right eye of the user cannot be aligned with the environmental object, resulting in less realistic AR content display. In the case where the virtual image is not aligned with the environmental object, there is a difference between an actual physical focal length when an eye views the virtual image and a focal length of the environmental object; a perceived distance of the virtual image perceived by the brain is different from the actual physical focal length, so that convergence and focusing fail to collaborate synchronously, causing discomfort to the user. For example, when contents associated with the environmental objects (i.e., the AR contents) need to be projected as a virtual image, a virtual image possessing only a single virtual imaging distance makes it difficult for the AR contents to be closely fitted to the real scene.

The present disclosure provides a refractor, an image source device, a display device, a transportation equipment and a display method, which can enable position match between the AR contents and the environmental objects to be easier; the match may refer to that positions of the two coincide, or may also refer to that the two are relatively close to each other (as long as a proximity degree meets use requirements). In some embodiments, at least one of the virtual images provided by HUD is a gradual zoom virtual image, for example, imaging distances of part of or all of the gradual zoom virtual image change gradually, which may alleviate the problems of parallax and visual convergence, for example, can adapt to environmental objects at different distances to display corresponding AR contents.

The display device provided by the embodiment of the present disclosure may be a head up display, or may also be a display device of a non-head up display class that may adopt the technical solution of the present disclosure.

At least one embodiment of the present disclosure provides a refractor; at least one of a distance between at least a part of the light exiting surface of the refractor and the light incident surface of the refractor and a refractive index of the refractor are different at different positions, so that the optical distance of light within the refractor corresponding to different positions on at least a part of the light exiting surface of the refractor are different. At least one embodiment of the present disclosure provides a display device; the display device includes: an image source component, a refractor and a processing portion. The image source component is configured to emit image light; the refractor is arranged on a light exiting side of the image source component, and is configured to change optical distances of at least part of the image light, so as to change imaging distances of at least a part of the virtual image formed by the image light; the processing portion is arranged on a light exiting side of the refractor; the processing portion is configured to cause at least part of the image light to propagate to the eyebox; and the at least part of the image light processed by the processing portion includes refracted light formed by the image light which is emitted by the image source component and then emitted from the refractor. In this way, by arranging the refractor on the light exiting side of the image source component, the optical distance of at least part of the image light is changed, so that the imaging distances of at least a part of the formed virtual image are different at different positions, thereby adapting to needs of an application environment. This allows the imaging distances of the contents displayed on the virtual image to match the distances of the environmental objects relative to the user, so as to achieve an effect that the virtual image display contents are closely fitted to the environmental objects at all times.

Hereinafter, specific implementations of the present disclosure will be described in detail in conjunction with the accompanying drawings.

FIG. 1B shows a schematic diagram of a head up display apparatus according to an embodiment of the present disclosure. As shown in FIG. 1B, the head up display apparatus includes: an image source component 100, a refractor 500 and a processing portion. For example, the processing portion includes an amplifier component 300. For example, the processing portion may further include an imaging window 400. The image source component 100 is configured to emit image light. The refractor 500 is arranged on a light exiting side of the image source component 100, and is configured to change the optical distance of at least part of the image light, so as to change the imaging distance of at least a part of the virtual image formed by the image light. The processing portion 300 is arranged on a light exiting side of the refractor 500, and is configured to cause at least part of the image light to propagate to an eyebox to form a virtual image; the at least part of the image light processed by the processing portion 300 include refracted light formed by the image light which is emitted by the image source component 100 and then emitted from the refractor 500. For example, refracted light emitted from different positions on at least part of the light exiting surface of the refractor 500 have different optical distances within the refractor 500, so that the imaging distance of at least a part of the virtual image formed by the image light is changed. For example, the imaging distances of a part of virtual image formed by the image light that is close to an observer are changed to change a curvature degree or a tilt degree of the portion of the virtual image that is close to the observer, so as to adjust a display effect of the portion of the virtual image that is close to the observer, for example, adjust a phenomenon that the virtual image does not have a more realistic fit-to-ground effect, due to excessive straightness (perpendicular to the ground) caused by poor curvature of the portion of the virtual image that is close to the observer. Or, imaging distances of a part of the virtual image formed by the image light that is away from the observer are changed, to change a curvature degree or a tilt degree of the portion of the virtual image that is away from the observer, so as to adjust a display effect of the portion of virtual image that is away from the observer, for example, to improve a phenomenon of excessive curvature of the portion of virtual image that is away from the observer. Or, imaging distances of the entire virtual image formed by the image light are changed to adjust a curvature degree or a tilt state of the entire virtual image, so that the entire virtual image is better fused with a driving scene and information conveyed by the virtual image; for example, in the case where the virtual image is an image of obstacles, pedestrians, vehicles, etc. on the road ahead in the driving field of view, the entire virtual image may be made substantially perpendicular to the ground; and in the case where the virtual image is an image of a road sign on the road ahead in the driving field of view, the entire virtual image may be enabled to have a better fit-to-ground effect.

In this way, the display device provided by at least one embodiment of the present disclosure can adapt to requirements of the application environment, so that the imaging distances of the contents displayed on the virtual image may match the distances of the environmental objects relative to the user, to achieve the effect that the virtual image display contents are closely attached to the environmental objects at all times. For example, by arranging the refractor, the virtual image can have certain curvature, for example, the virtual image may adapt to changes in a curvature degree of the road surface in real time; for example, if the virtual image is a road sign image on the ground, the road sign image can have a better fit-to-ground effect; or, the virtual image can be adjusted to adapt to changes in differences such as the orientation of the vehicle, the shape of obstacles, etc. in real time; or, the virtual image may have a tilt state, and a tilt degree of the tilted image presented to the user (e.g., a driver or a passenger) through the display device provided by the embodiment of the present disclosure can be uniformly consistent, which can prevent the presented tilted image from having an excessively curved portion, thereby avoiding problems such as unclear information display and impact on user impressions due to excessive curvature of the image. This can better fuse the image with the external physical objects, obtain a better visual effect, and improve use experience provided by the display device to the user.

For example, the processing portion 300 includes an amplifier component; and the amplifier component is configured to process the refracted light to form amplified light emitted from the amplifier component 300, and form a virtual image through the amplified light to amplify the formed virtual image.

In the present disclosure, the optical distance refers to a product of a geometric distance traveled by light and a refractive index of a propagation medium. In the case where the refractor 500 is provided, the geometric distance of the image light emitted by the image source component 100 to the amplifier component 300 include a portion passing through the refractor 500 and a portion passing through the air. The optical distance in the refractor 500 is a product of the portion of the geometric distance of the image light passing through the refractor 500 and a refractive index of the refractor 500 that the image light pass through; as compared with the case of light propagation in air with the same shape and the same volume, the refractive index of the refractor 500 is different from that of air, so as to adjust the optical distance. In a process that the image light emitted by the light exiting surface of the image source component 100 propagate from the light exiting surface of the image source component 100 to the amplifier component 300, the refractor 500 adds an additional optical distance to the optical distance of the image light in this propagation process. The additional optical distance is a product of the portion of the geometric distance of the image light passing through the refractor 500 and the refractive index of the refractor 500 that the image light pass through. Or, the above-described “additional optical distance” may also be defined as a product of a part of the geometric distance of the image light passing through the refractor 500 in a process that the image light emitted by at least a part of region of the image source component 100 propagate to the amplifier component 300 and a refractive index difference obtained by subtracting the refractive index of air from the refractive index of the refractor 500 the image light pass through. The same applies to the meaning of the optical distance or the optical distance according to the embodiments below including the refractor 120 and the image source component 130.

The image source component 100 may be any device capable of forming image light, which may be a monochrome image source, or may also be a color image source, or may also include an auxiliary apparatus other than the image source, for example, a filter, a correction filter, a light path compensator, etc. Specific types of the image source component 100 are not limited in the present disclosure.

For example, the image source component 100 may be an image source that may emit mixed RGB light, a light emitting diode (LED) display, a liquid crystal display (LCD), etc. For another example, the image source component 100 includes a backlight source and a display screen, the display screen may be a liquid crystal display (LCD), a thin film transistor (TFT), a digital light processing (DLP) apparatus, or a liquid crystal on silicon (LCOS) display that display a virtual image or a real image.

As an optional component, the reflector 200 includes at least one selected from the group consisting of a flat mirror, a curved mirror, a non-spherical mirror, and a spherical mirror; a main function of the reflector 200 is reflecting the image light emitted by the image source component 100 to the amplifier component 300; one or more reflectors 200 may be arranged to reduce a volume of the HUD, but the reflector 200 is not necessary and may be omitted.

The amplifier component 300 may be composed of a single component or a plurality of optical components such as a reflective optical component, a refractive optical component, a diffractive optical component, etc., which may appropriately amplify and project the virtual image displayed by the image source component 100, so that the user may see the magnified virtual image. The amplifier component 300 may be any optical structure capable of amplifying an image, which will not be limited in the present disclosure. For example, the amplifier component 300 may be a concave mirror, a freeform surface mirror, or a HOE film or optical waveguide, etc. having an amplifying function. Preferably, the amplifier component 300 adopts a concave reflective mirror; the processing portion may further include an imaging window 400 (e.g., a windshield); and the amplifier component 300 may cooperate with the imaging window 400 included in the processing portion, to eliminate virtual image distortion caused by the imaging window 400.

The refractor 500 may be a transparent solid medium, for example, a transparent plastic medium, a transparent crystal, etc., or may also be a liquid or colloid capable of producing a refractive effect. Any material capable of changing an optical distance may be selected.

The function of the refractor 500 rests in changing the optical distance of the image light when the image light passes through the refractor 500. Due to difference in environmental objects in the real scene, the virtual image required to have close fitting characteristics needs to have complex plane types and/or tilt angles. By arranging the refractor 500 whose refractive index 500 is different from that of air, plane types and/or tilt angles required may be formed by changing the optical distance.

For example, dashed lines in FIG. 1B represent image light which has not been changed by the refractor 500, while solid lines represent image light which has passed through the refractor 500 and been changed, these image light jointly form a virtual image shape different from that in FIG. 1A. A shape of the light exiting surface of the refractor 500, as well as thickness changes and refractive index changes in respective positions of the refractor 500, determine the plane type and/or the tilt angle of the virtual image. The virtual image formed by the refractor 500 may include a flat portion attached to the ground, as well as at least one left portion or right portion, and may further include a vertical portion in front, a top portion, etc. These portions may be formed by the same one image source, or may also be formed by a plurality of image sources.

FIG. 1C shows a schematic diagram of an imaging plane of a virtual image formed by the refractor. As shown in FIG. 1C, the imaging plane of the virtual image is deformed as affected by the refractor 500. The imaging plane of the virtual image may be deformed from a flat plane to a curved plane, for example, a curved plane, a U-shaped plane, a dustpan-shaped plane, or other arc-shaped face, etc., or may also be deformed from a curved plane to a flat plane, or may also be deformed to have different curvature degrees, curvature directions, etc.

FIG. 1D shows a structural schematic diagram of a display device provided by an embodiment of the present disclosure. As shown in FIG. 1D, at least one embodiment of the present disclosure provides a display device, including an image source component 130 (equivalent to the image source component 100 in FIG. 1B), a refractor 120 and an amplifier component 140; the image source component 130 is configured to emit image light; the refractor 120 (equivalent to the refractor 500 in FIG. 1B) is configured to refract image light incident thereto to emit refracted light; the amplifier component 140 (equivalent to the amplifier component 300 in FIG. 1B) is configured to at least amplify the refracted light incident thereto to emit amplified light for imaging; image light emitted from at least some different positions on a light exiting surface of the refractor 120 have different optical distances within the refractor 120; and/or, the refracted light is processed through the amplifier component 300 to form amplified light, the optical distances within the refractor of the image light emitted from different positions on at least part of the light exiting surface of the refractor have an association relationship with the virtual image formed by the amplified light relative to a change of a reference image. The reference image is an image formed by the amplified light obtained by processing the image light emitted by the image source component through the amplifier component 300 assuming that there is no refractor. The amplified light is light emitted from the amplifier component 300 after processing the image light through the amplifier component 300. The foregoing association relationship refers to that the change of the image formed by the amplified light relative to the reference image is related to the change of the optical distance of the light caused by the refractor. For example, by changing the optical distance of the light through the refractor, a reference image originally having a curved plane can be deformed into an image having a flat plane, or, a reference image originally having a flat plane can be deformed into an image having a curved plane, or, a reference image originally having a curved plane can be deformed into an image having another curved plane type, but it is not limited to these cases.

Based on this, in the present disclosure, the refractor 120 is added in the display device (e.g., the HUD) to change the optical distance of at least part of the light, so that imaging distances in different positions of the virtual image are different, to achieve an objective that the imaging distances of the virtual image gradually change; even if a distance of the vehicle changes relative to the environmental objects, the AR contents displayed on the virtual image can be well fitted to the corresponding environmental objects, thereby solving the problems of parallax and/or visual convergence and improving use experience of the HUD.

The amplifier component may also be referred to as an optical relay component; the amplifier component may be composed of a single or a plurality of optical components such as a reflective optical component, a refractive optical component, a diffractive optical component, etc., which may appropriately amplify the image light emitted by the image source component towards a reflective imaging portion (e.g., a windshield) and project the image light, so that the image light is reflected by the reflective imaging portion to the eyebox, thereby allowing the user to see the virtual image.

In the case where the refractor 120 is provided, the geometric distance of the image light emitted from the image source component 130 to the amplifier component 140 includes a portion passing through the refractor 120 and a portion passing through the air. If there are other optical devices between the two, the geometric distance of the image light emitted from the image source component 130 to the amplifier may also include other portions, which is limited to the above cases in this embodiment.

With respect to the reference image, there is a correspondence relationship between optical distances of image light in different positions and imaging distances in corresponding positions in the virtual image, therefore imaging distances in respective positions in the virtual image can be adjusted by means such as adjusting the shape of the light exiting surface of the refractor 120, adjusting the thickness changing in respective positions of the refractor 120 and refractive indices in respective positions of the refractor 120, which thereby causes the virtual image further to possess an appropriate image plane shape (which may be briefly referred to as a plane type).

FIG. 2 to FIG. 13 show structural schematic diagrams of the refractor changing a plane type of imaging provided by an embodiment of the present disclosure.

For example, referring to FIG. 2 to FIG. 13, the virtual image formed by the refractor 120 at least includes a left portion, or may include a ground portion (G) fitted to the ground, at least one left portion (L) or right portion (R), and may further include a vertical front portion (F), a top portion (T), and so on. These portions should belong to the same one virtual image. The shape of the light exiting surface of the refractor 120 from the top view may be cone-shaped or trapezoidal.

According to the embodiment of the present disclosure, the virtual image may be deformed from a flat plane into a curved plane, or may be deformed from a curved plane into a flat plane, or may be deformed into curved planes with different curvature degrees, curvature directions, etc., but it is not limited to the above cases.

As shown in FIG. 2 to FIG. 13, the display device is configured to allow the user to observe the virtual image through the eyebox of the display device; and the virtual image at least includes a left virtual image portion and/or a right virtual image portion.

Or, the display device is configured to allow the user to observe the virtual image through the eyebox of the display device, the virtual image at least includes a first virtual image portion and a second virtual image portion whose image plane extension directions intersect with each other, and the first virtual image portion and the second virtual image portion are connected.

Or, the display device may be configured to allow the user to observe the virtual image through the eyebox of the display device, the virtual image at least includes a first virtual image portion and a second virtual image portion whose image plane extension directions intersect with each other, and light used for forming the first virtual image portion and the second virtual image portion come from the same one image source display included in the display device.

The above-described virtual image is a continuous virtual image, or the virtual image includes a plurality of virtual image portions whose image plane extension directions intersect with each other, and adjacent virtual image portions among the plurality of virtual image portions are at least partially connected; and/or, the display device includes an image source component having an image source display, the image source display includes a first display region and a second display region, image light emitted from the first display region correspond to the left virtual image portion and/or the right virtual image portion, and image light emitted from the second display region correspond to the remaining portion of the virtual image.

The amplifier component includes a zoom curved mirror, and a plane type of the zoom curved mirror matches at least a part of the image plane shape of the virtual image.

From the perspective of the virtual image, a continuous virtual image imaging may be divided into a left virtual image portion (L), a right virtual image portion (R), a front bottom sub-virtual image portion (a ground virtual image portion) (G), a front sub-virtual image portion (F), and a front top sub-virtual image portion (a top virtual image portion) (T).

Virtual image combinations formed by the continuous virtual image may include respective cases below:

1. L—single left; R—single right; LR—left and right.
2. LG—left and ground; RG—right and ground.
3. LGR—left, right, and ground.
4. LGR+F—left, right, ground, and front.
5. LGR+F+T—left, right, ground, front and top.

In addition, according to use requirements of the imaging component, they may also be configured as LGF, RGF, LGT, RGT, and so on.

Since positions of the driver's cabin in different countries may be different, a single-sided virtual image may be applicable to different countries (adopting left-hand drive or right-hand drive), and the virtual image formed in a single-sided virtual image is continuously transitional.

For example, in some examples, the display device may be configured to allow the user to observe the virtual image formed by the display device in the eyebox, the virtual image at least includes a first virtual image portion and a second virtual image portion whose image plane extension directions intersect with each other, and the first virtual image portion and the second virtual image portion are connected.

It may be understood here that a region in which the observer needs to view imaging, that is, the eyebox, may be preset according to actual needs. The eyebox refers to a region in which the observer's eyes are located and can see the image displayed by the display device, and may be, for example, a planar region or a stereoscopic region.

For example, the first virtual image portion and the second virtual image portion may be any two selected from the virtual images corresponding to the left virtual image portion (L), the right virtual image portion (R), the front bottom sub-virtual image portion (G), the front sub-virtual image portion (F), and the front top sub-virtual image portion (T).

FIG. 2 to FIG. 13 respectively show imaging schematic diagrams of imaging states of the display device provided by at least one embodiment of the present disclosure, including imaging schematic diagrams of L, L+G, L+R+F, L+T, L+R+G, L+R+G+T, L+R+T, L+R+T+G+F square wireframes, L+R+T+G+F adjustment, and R.

The display device according to a first aspect embodiment is configured to allow the user to observe the virtual image through the eyebox of the display device. The virtual image at least includes the left virtual image portion (L) and/or the right virtual image portion (R), that is, the left virtual image portion (L) and the right virtual image portion (R) corresponding thereto.

It may be understood here that, for example, in some embodiments, types of virtual image portions may be classified according to positions of the virtual image portions relative to a travel route of light in the viewing effect of the user; for example, the virtual image portions may be the left virtual image portion located on the left side of the travel route, the right virtual image portion located on the right side of the travel route, or the front virtual image portion located between the left virtual image portion and the right virtual image portion.

For example, in some embodiments, the virtual image may include one virtual image portion; or, the virtual image may include two virtual image portions, and extension directions of image planes on which the two virtual image portions are respectively located intersect with each other or are substantially parallel to each other; or, the virtual image includes at least three virtual image portions, and extension directions of image planes on which at least some adjacent virtual image portions are located intersect with each other.

For example, in the case where the virtual image only includes the left virtual image portion (L), the virtual image is a continuous virtual image. That is, in such state, the image content of the left virtual image portion (L) may be continuous or discontinuous, but the overall imaging of the left virtual image portion (L) is a non-spliced and/or a continuous zoom virtual image, which allows the user to solve problems such as parallax and/or visual convergence by forming a continuous zoom virtual image in a process of observing the left virtual image portion (L).

Similarly, for example, the virtual image may also be configured to include only the right virtual image portion (R), and in this case, the virtual image is also a continuous virtual image. That is, in such state, the picture content of the right virtual image portion (R) may be continuous or discontinuous, but the overall imaging of the right virtual image portion (R) is a non-spliced and continuous zoom virtual image, which allows the user to solve problems such as parallax and/or visual convergence by forming a continuous zoom virtual image in a process of observing the right virtual image portion (R).

For example, the virtual image may also be configured to include both the left virtual image portion (L) and the right virtual image portion (R) at the same time; and in such configuration state, the virtual image is also a continuous virtual image. That is, the image content of the left virtual image portion (L) or the right virtual image portion (R) may be continuous or discontinuous, but the overall imaging of both the left virtual image portion (L) and the right virtual image portion (R) is a non-spliced and continuous zoom virtual image. Moreover, if the left virtual image portion (L) and the right virtual image portion (R) are connected, a connection between the two is also a non-spliced and continuous zoom virtual image.

Further, the virtual image formed by the display device may also include a middle virtual image portion, the middle virtual image portion includes one or more selected from a group consisting of a front bottom sub-virtual image portion (G), a front sub-virtual image portion (F), and a front top sub-virtual image portion (T). For example, the front bottom sub-virtual image portion (G), the front sub-virtual image portion (F), and the front top sub-virtual image portion (T) correspondingly display an image on the ground, an image in the front, and an image on the top (on the sky) in sequence.

For example, one or more of the left virtual image portion (L), the right virtual image portion (R), the front bottom sub-virtual image portion (G), the front sub-virtual image portion (F), and the front top sub-virtual image portion (T) may be configured to be perpendicular or tilted to the ground.

The virtual image is configured as a virtual image of which any adjacent virtual image portions are connected, and a connection position between the adjacent virtual image portions is non-spliced and continuous zoom. For example, the finally formed continuous virtual image may be configured as a dustpan-shaped virtual image (LGR+F) which includes the left virtual image and the right virtual image portion, the front bottom sub-virtual image portion, and the front sub-virtual image portion; in this case, the position between the left virtual image portion and the front bottom sub-virtual image portion, the position between the left virtual image portion and the front sub-virtual image portion, the position between the right virtual image portion and the front bottom sub-virtual image portion, and the position between the left virtual image portion and the front virtual image portion are all configured to be in a connected state. By forming a non-spliced and continuous zoom virtual image, the problems such as parallax and/or visual convergence of the user may be effectively solved. As compared with the U-shaped (LGR left-ground-right or LFR left-front-right) virtual image, the dustpan-shaped (LGR+F) virtual image can solve the problems of fit to the ground and fit to two sides, without affecting the display of an image in the distance ahead.

It may be understood that in an actual configuration process, the front bottom sub-virtual image portion (G), the front sub-virtual image portion (F), and the front top sub-virtual image portion (T) may be flexibly selected according to requirements in the finally formed virtual image. In the finally configured virtual image, if the middle virtual image portion includes more than one selected from the group consisting of the front bottom sub-virtual image portion (G), the front sub-virtual image portion (F), and the front top sub-virtual image portion (T), then adjacent virtual image portions in a middle virtual image portion are at least partially connected. For example, if the middle virtual image portion includes the front bottom sub-virtual image portion (G) and the front sub-virtual image portion (F), then at a connection position between the front bottom sub-virtual image portion (G) and the front sub-virtual image portion (F), at least a part of image is a non-spliced and continuous zoom virtual image. For example, the adjacent sub-virtual image portions in the middle virtual image portion are completely connected to each other, to achieve a better effect of preventing parallax and visual convergence.

In some embodiments, the display device may be configured to include an image source component having an image source display, the image source display includes a first display region and a second display region, image light emitted from the first display region correspond to the left virtual image portion (L) and/or the right virtual image portion (R), and image light emitted from the second display region correspond to the remaining portion of the virtual image. The first display region and the second display region are arranged on the same one image source display. That is, light used for forming the first virtual image portion and the second virtual image portion come from the same one image source display of the display device.

For example, referring to FIG. 2 to FIG. 4, in the virtual image formed by the display device, imaging distances in different positions gradually change in a forward direction (e.g., a direction from the eyebox 110 to an imaging indicating point in FIG. 2). It should be noted that the ground according to this embodiment is not limited to a strictly horizontal ground, the terms "horizontal" and "vertical" according to this embodiment are not limited to "absolute horizontal" and "absolute vertical"; the term "horizontal" may be understood as "horizontal relative to the ground", and the term "horizontal" represents a horizontal level allowing errors in engineering; and similarly, the term "vertical" may be understood as "vertical relative to the ground", and the term "vertical" represents a vertical level allowing errors in engineering.

Referring to FIG. 2 to FIG. 13, virtual images with different image plane shapes and/or tilt angles in different positions within a polar coordinate system can be formed, by adopting combinations of different refractors, different areas of the image source covered by the refractors and different positions of the image source covered by the refractors, etc.

According to the embodiment of the present disclosure, the refractor 120 may include a tilt angle adjustment type refractor and/or an image plane shape adjustment type refractor. For example, the refractor 120 may only adjust the tilt angle of the virtual image, for example, adjust the virtual image from a first tilt angle to a second tilt angle. Or, the refractor 120 may only adjust the image plane shape, for example, adjust a flat-plane virtual image to a curved-plane virtual image, or adjust a curved-plane virtual image to a flat-plane virtual image, or adjust a curved-plane virtual image to another curved-plane virtual image, etc.

With respect to the tilt angle adjustment type refractor, referring to FIG. 1D, the display device further includes a reflective imaging portion 200, the amplified light corresponding to the refracted light is reflected by the reflective imaging portion 200 to form the virtual image, and the amplified light is reflected by the reflective imaging portion 200 to form a reference image assuming that no refractor 120 is provided; the refractor 120 is configured to adjust a first included angle between the reference image and the horizontal direction to a second included angle between the virtual image and the horizontal direction.

For example, assuming that no refractor 120 is provided in the display device, the display device forms the reference image, and the reference image has a first included angle with the horizontal direction (e.g., the reference image is perpendicular to the ground). In this embodiment, the display device includes the refractor 120, because the refractor 120 adjusts the optical distance of at least part of the image light, the virtual image really formed by the display device has a second included angle with the horizontal direction, and the second included angle is different from the first included angle.

With respect to the image plane shape adjustment type refractor, referring to FIG. 1D, the display device further includes a reflective imaging portion 200, the amplified light corresponding to the refracted light is reflected by the reflective imaging portion 200 to form the virtual image; the amplified light is reflected by the reflective imaging portion 200 to form a reference image assuming that no refractor 120 is provided; the refractor 120 is configured to adjust a first image plane shape of the reference image to a second image plane shape of the virtual image, and the second image plane shape is different from the first image plane shape; the first image plane shape is a flat plane, and the second image plane shape is a flat plane or a curved plane; or, the first image plane shape is a curved plane, and the second image plane shape is a flat plane or a curved plane different from the first image plane shape.

In some examples, in order that the virtual image has a set image plane shape and/or tilt angle, at least one of the distance between at least a part of the light exiting surface of the refractor 120 and the light incident surface of the refractor 120 and the refractive index of the refractor 120 may be changed, so that optical distances within the refractor 120 of light corresponding to different positions on at least a part of the light exiting surface of the refractor 120 are different.

For example, if refractive indices at all positions of the refractor are the same, then positions on the virtual image corresponding to light passing through different positions on the same contour line of the refractor are located on the same radius in a polar coordinate system (the polar coordinate system may take a center point of the eyebox as the origin point).

According to the embodiment of the present disclosure, at least a part of the light exiting surface of the tilt angle adjustment type refractor is a flat plane; and/or, the light exiting surface of the image plane shape adjustment type refractor is a flat plane or a curved plane.

FIG. 14 to FIG. 21 show structural schematic diagrams of a refractor provided by at least one embodiment of the present disclosure.

As shown in FIG. 14 to FIG. 21, a lower surface of the refractor 120 is a surface of the refractor 120 that is close to the image source component 130, which may also be considered as a light incident surface; and an upper surface of the refractor 120 is a surface of the refractor 120 that is away from the image source component 130, which may be considered as a light exiting surface. Of course, concepts of upper, lower, left and right are related to the arrangement position of the refractor 120, which are only illustrated by means of examples in this embodiment.

In some examples, the thickness of at least a part of the refractor 120 gradually changes along at least one direction. The thickness of the refractor 120 refers to the thickness of the refractor 120 in the direction perpendicular to the light incident surface of the refractor 120. For example, a left-right direction on a paper surface in FIG. 1D is defined as a length direction of the image source, the direction perpendicular to the paper surface in FIG. 1D is defined as a width direction of the image source, and an up-down direction on the paper face in FIG. 1D is defined as a thickness (also referred to as height) direction of the image source.

For example, from one end to the other end of the refractor 120, the thickness of the refractor 120 may gradually increase or gradually decrease, or gradually increase firstly and then gradually decrease, or gradually decrease firstly and then gradually increase, etc. along the length direction and/or the width direction of the image source.

And/or, as shown in FIG. 20 and FIG. 21, the light exiting surface of the refractor 120 has contour lines, a line formed by connecting respective points representing a same thickness of the refractor 120 on the light exiting surface of the refractor 120 constitutes a contour line of the refractor 120; at least a part of the contour lines of the refractor 120 is at least one selected from the group consisting of a straight line, a curved line, or a broken line. The height represented by a contour line refers to a height of a position on the light exiting surface of the refractor 120 relative to the light incident surface of the refractor 120. In this way, the shape and the thickness of the light exiting surface of the refractor 120 meet requirements, thereby obtaining the desired virtual image. For example, based on the imaging principle, corresponding positions in the virtual image finally formed by the image light emitted from positions on the same one contour line of the refractor 120 are located on the same one circumference of the polar coordinate system, and the polar coordinate system takes a set reference point as the origin point. The set reference point may be the center point of the eyebox or other reference point, which is not limited here. Here, the feature "corresponding positions in the virtual image" refers to that in an imaging process, the image light emitted from the light exiting surface of the refractor 120 form the virtual image, so the image light emitted from each position (a position A) on the light exiting surface of the refractor 120 correspond to a certain position (a position B) in which the virtual image is formed by the respective image light, and thus, image light emitted from each position on the same contour line (equivalent to the above-described position A) of the refractor 120 also correspond to a certain position (equivalent to the above-described position B) on the virtual image, and the certain position (equivalent to the above-described position B) of the virtual image is just the corresponding position in the virtual image finally formed by the image light emitted from position (equivalent to the above-described position A) on the same one contour line of the refractor 120. That is, the position B of the virtual image that corresponds to the position A on the same contour line of the refractor 120 is located on the same circumference of the above-described polar coordinate system.

In order to meet plane types and/or tilt angles of different virtual images, the refractive index and the thickness of the refractor 120 may be adjusted accordingly. By adjusting the thickness of the refractor 120, the plane type of the light exiting surface of the refractor 120 may be changed, for example, a flat plane type or a curved plane type may be formed.

According to the embodiment of the present disclosure, at least part of the contour lines of the refractor 120 are straight lines, and are distributed at equal intervals or variable intervals along a first direction or a second direction. The first direction may be one of the length direction or the width direction of the image source component 130, and the second direction may be the other of the length direction or the width direction of the image source component 130. The contour line of the refractor 120 may be understood as a line connecting positions with the same thickness in the refractor 120.

Or, at least part of the contour lines of the refractor 120 are closed curves, and are distributed at equal intervals or variable intervals along the first direction or the second direction; and FIG. 20 and FIG. 21 show a schematic planar view and a stereoscopic structural schematic diagram of a refractor 120 whose contour lines are closed curves.

Or, at least part of the contour lines of the refractor 120 are non-closed curves, and are distributed at equal intervals or variable intervals along the first direction or the second direction; or, at least part of the contour lines of the refractor 120 are broken lines, and are distributed at equal intervals or variable intervals along the first direction or the second direction.

By arranging different shapes of refractors 120 on the image source component 130 (e.g., the refractors 120 may be made of glass or other materials that may transmit light and change the optical distance), different shapes of virtual images can be obtained. In this embodiment, a virtual image formed by light emitted from one image source component is referred to as one layer or one virtual image, and imaging distances at different positions in the virtual image may be different, but belong to the same virtual image.

In this way, by using different contour lines or combinations of different contour lines, a desired refractor can be formed, and further a desired virtual image can be formed by using the refractor.

In some preferred modes, the contour line is at least one selected from the group consisting of a U-shaped contour line, a rounded polygonal contour line, and an L-shaped contour line. A refractor 120 with such contour line can form a virtual image whose image plane shape is more complex, so that AR contents may be exhibited in various positions and at various imaging distances, resulting in a better overall imaging effect of the virtual image.

Refractive indices in respective positions of the foregoing refractor 120 may be consistent or deviate by less than a threshold (e.g., 0.1), and such refractor 120 may be processed more conveniently and simply with lower costs.

In other examples, refractive indices of at least a part of the refractor 120 gradually change along at least one direction. In this way, even if thicknesses in different positions of the refractor are not changed, optical distances of light in different positions may also be different, thereby obtaining a virtual image with a desired image plane shape and tilt angle.

Of course, the thickness and the refractive index of the refractor 120 may be adjusted in combination, as long as the optical distance of the image light after being adjusted by the refractor 120 meets requirements.

According to at least one embodiment of the present disclosure, the contour line is at least one selected from the group consisting of a U-shaped contour line, a rounded polygonal contour line, and an L-shaped contour line.

For example, in one example, the structure of the refractor 120 satisfies that along the left-right direction of the refractor 120, the optical distance of image light emitted from at least a part of region gradually change after the image light pass through the refractor 120, so that imaging distances (VIDs) from different positions in the formed virtual image to the eye gradually change.

For example, in a horizontal polar coordinate system, as a horizontal angle (the angle φ in FIG. 2) at different positions in the virtual image gradually increases, the imaging distance of these positions gradually decreases. In other words, in at least one of the left side and the right side of the virtual image, the larger the horizontal angle, the closer the imaging distance of the virtual image.

For another example, in a vertical polar coordinate system, as a vertical angle (an angle θ in FIG. 2) at different positions in the virtual image gradually increases, the virtual imaging distance of these positions gradually decreases or increases. The zero point of the vertical angle may be parallel to the ground, but it is not limited this case. In other words, the larger the lower viewing angle, the closer the imaging distance of the virtual image.

In this way, in the driving process, it is observed that some AR contents in the virtual image are located on both sides of the road; the AR contents move towards two sides of the user as they move closer to the user, the size of the AR contents gradually become larger as they are getting closer, while AR contents in the distance are smaller and located close to the middle of the road. Since the imaging distances of the virtual image according to this embodiment may gradually change in the horizontal angle and the vertical angle of the polar coordinate system, the AR contents may be displayed at distances that match the environmental objects in appropriate sizes, so that the AR contents and the environmental objects may be aligned or coincide, thereby solving the problems of parallax and visual convergence, and achieving gradual change of point of interest (POI, for example, road signs, traffic lights, pedestrians, vehicles, buildings, etc.) from far to near.

By the gradually change of the distance between the light incident surface to the light exiting surface of the refractor 120, imaging distances of different positions of the virtual image may be adjusted to achieve an effect that if the optical distance of the part A of the virtual image is smaller, then the imaging distance of the part A of the virtual image is farther (larger), and if the optical distance of the part B of the virtual image is larger, then the imaging distance of the part B of the virtual image is closer (smaller). Referring to FIG. 20 to FIG. 21, the thickness of the refractor 120 gradually changes, the thickness of the refractor 120 may be smaller in the center of the refractor 120 and gradually increases towards the periphery around the center, or, the thickness of the refractor 120 may be smaller at the edge of the refractor 120 and gradually increases towards the center.

Except changing the virtual image by using the refractor 120, the refractor 120 may also be used for realizing flexibly arranging the position of the image source; the image source may be arranged horizontally, and the arrangement of the image source cooperates with the refractor 120, which can adjust the virtual image position and/or the image plane shape without adjusting the image source position, and can reduce the requirement for a mounting angle of the image source. In other embodiments of the present disclosure, the image source may also be arranged at any other angle, and the required virtual image can be realized by adding a corresponding refractor 120, which can reduce the requirement for the mounting angle of the image source, thereby improving the efficiency and reducing costs.

In some examples, the light incident surface of the refractor 120 is a flat plane and parallel to the light exiting surface of the image source component 130, refractive indices in all positions of the refractor 120 are the same, and the distance between the light incident surface and the light exiting surface of the refractor 120 gradually changes along the direction perpendicular to the light incident surface and/or the direction parallel to the light incident surface. The gradual change includes, but is not limited to, gradual increase, gradual decrease, or a combination of gradual decrease and gradual increase.

In other examples, the light incident surface of the refractor 120 is a flat plane and parallel to the light exiting surface of the image source component 130, the light exiting surface of the refractor 120 is a flat plane and parallel to the light incident surface, and the refractive index of the refractor 120 gradually changes along the direction perpendicular to the light incident surface and/or the direction parallel to the light incident surface. Gradual change includes, but is not limited to, gradual increase, gradual decrease, or a combination of gradual decrease and gradual increase.

In some other examples, the light incident surface of the refractor 120 is a flat plane and parallel to the light exiting surface of the image source component 130; refractive indices in at least two regions of the refractor 120 are different along the direction perpendicular to the light incident surface and/or the direction parallel to the light incident surface; and distances from at least two regions of the light exiting surface to the light incident surface of the refractor 120 are different, as long as the optical distance may gradually change with position. The gradual change includes, but is not limited to, gradual increase, gradual decrease, or a combination of gradual decrease and gradual increase.

Of course, the structure of the refractor 120 is not limited to the above-described three cases, as long as a gradual zoom virtual image can be realized.

The refractor 120 may be a transparent solid medium, for example, a transparent plastic medium, and a transparent crystal, etc.; or may also be liquid or colloid that may refract light, as long as the optical distance may be changed without affecting imaging. The refractor 120 may be made of at least one selected from the group consisting of an inorganic material, an organic material, and a composite material; for example, the inorganic material may include glass, quartz, etc., the organic material may include, for example, a polymer material, for example, a resin material, etc., and the composite material may include metal oxide doped polymethyl methacrylate, etc. The material of the refractor 120 is not limited to the above-listed materials, as long as it is transparent and has a refractive index different from that of air.

The refractor 120 is transparent, and the refractive index of the refractor 120 is different from the refractive index of air. In the present disclosure, the refractive index of the refractor 120 is greater than the refractive index of air, that is, greater than 1. Transmittance of the refractor 120 to light ranges from 60% to 100%. For example, the transmittance of the refractor 120 to light ranges from 80% to 99%. For example, the transmittance of the refractor 120 to light ranges from 90% to 99%.

According to the embodiment of the present disclosure, the refractor 120 may be an integral structure, or may also be formed by splicing or stacking a plurality of sheet-like sub-refractors; the plurality of sub-refractors are arranged in sequence to form one refractor 120; the refractor 120 may include a plurality of stacked sub-refractors; and refractive indices of the plurality of sub-refractors may be the same or different. The plurality of sub-refractors may be made of different materials to have different refractive indices. And/ or a distance from a light incident surface to a light exiting surface of each sub-refractors may also be different, so as to have a different refractive index.

According to the embodiment of the present disclosure, the refractor 120 covers at least a part of the light exiting surface of the image source component 130, and at least a part of the refractor 120 is attached to the light exiting surface of the image source component 130. Or, there may be a gas medium layer between at least a part of the refractor 120 and the image source component 130.

Here, the feature "the refractor 120 covers at least a part of the light exiting surface of the image source component 130" refers to that an orthographic projection of the refractor 120 on a plane on which the light exiting surface of the image source component 130 is located at least partially overlaps with the light exiting surface of the image source component 130.

In one case, if a part of the refractor 120 is attached to the light exiting surface of the image source component 130, in order to prevent adverse effects caused by the refractor 120 on the liquid crystal display of the image source component 130, a transparent protective element is provided between at least a part of the refractor 120 and the light exiting surface of the image source component 130. Arranging the transparent protective element can avoid the impact caused by stress subjected to the liquid crystal display screen or deformation of the liquid crystal display screen on the display effect of the liquid crystal display screen, for example, can avoid contrast loss.

For example, the transparent protective element is fixedly arranged on a bearing bracket; the refractor 120 is fixedly mounted on the light exiting surface of the transparent protective element; the image source component 130 further includes a light modulation layer, for example, a liquid crystal display screen; the liquid crystal display screen is attached to the light incident surface of the transparent protective element; and a bottom surface of the liquid crystal display screen is suspended or provided with a stress buffering structure. The refractor 120 may also be bonded with the light exiting surface of the image source component 130 by transparent optical adhesive.

In a specific example, the transparent protective element may be coupled to a support frame or other support structure, the support frame or the support structure carries gravity of the transparent protective element; when the transparent protective element deforms, the support frame or the support structure adapts to such deformation to avoid applying stress which is caused by deformation of the transparent protective element to the liquid crystal display screen.

The liquid crystal display screen of the image source component may be attached to the transparent protective element through a structure such as transparent adhesive, and an edge of the image source component is supported and limited by another frame to maintain the stability of the liquid crystal display screen.

By providing the transparent protective element, the transparent protective element can bear the refractor 120, and prevent the gravity of the refractor 120 from acting on the liquid crystal display screen which can cause contrast loss of the liquid crystal display screen.

The transparent protective element may have refractive indices and thicknesses substantially equal at all positions, in this way, even if the transparent protective element is provided, it will not have adverse effects on the tilt angle and the plane type of the virtual image.

For example, the transparent protective element may be made of glass, for example, the transparent protective element may be made of a glass brick. For example, the transparent protective element may also be made of any transparent member that may carry the refractor, for example, quartz or resin. The material of the transparent protective element is not limited in the embodiments of the present disclosure.

In another embodiment, for example, the refractor 120 covers the entire image source component 130, for example, covers the entire light exiting surface of the image source component 130 or covers the entire transparent protective element, the image source component 130 includes a light modulation layer, and the light modulation layer includes a liquid crystal display screen, then a transparent protective element may be provided between the refractor 120 and the image source component 130, or the transparent protective element may be omitted. If the transparent protective element is omitted, then the refractor 120 can implement the function of the transparent protective element instead.

With respect to the case where the transparent protective element is provided, the thickness of the transparent protective element is greater than or equal to 1/200 of a diagonal length of the liquid crystal display screen. If no transparent protective element is provided, then a minimum thickness of the refractor 120 is required to be greater than or equal to 1/200 of the diagonal length of the liquid crystal display screen. In this way, the transparent protective element or the refractor 120 may have good rigidity, which can reduce deformation of the transparent protective element or the refractor 120, to avoid stress acting on the liquid crystal display screen.

For example, in another embodiment, for example, if the refractor 120 covers a part of the image source component 130, the thickness of the refractor 500 gradually changes in a direction from the portion of the image source component 130 that is covered by the refractor 120 to the portion of the image source component 100 that is not covered by the refractor 120, so as to gradually adjust a part of the virtual image formed by light corresponding to the portion of the image source component 130 that is covered by the refractor 120, thereby realizing gradual deformation of the virtual image, for example, adjust the curvature degree of this portion of the virtual image, thereby avoiding rupture or disconnection of the virtual image, or avoiding excessive deformation, for example, excessive curvature of this portion of the virtual image, to solve the technical problem of uneven curvature degrees of the portion of the virtual image corresponding to the image source component 130 that is covered by the refractor 120 and the portion of the virtual image corresponding to the image source component 130 that is not covered by the refractor 120 of the entire virtual image, which is favorable for making the tilt degrees of the entire virtual image uniform, thus to provide the user with better viewing experience.

For example, if the refractor 120 covers a part of the light exiting surface of the image source component 130 or the light exiting surface of a part of the transparent protective element, and the thickness of the refractor 500 gradually changes in the direction from the portion of the light exiting surface of the image source component 130 (or of the transparent protective element) that is covered by the refractor 120 to the portion of the light exiting surface of the image source component 100 (or of the transparent protective element) that is not covered by the refractor 120.

For example, the thickness of the refractor 500 gradually decreases in the direction from the portion of the image source component 130 that is covered by the refractor 120 to the portion of the image source component 100 that is not covered by the refractor 120. Of course, the above-described feature like "gradual change/gradually change" in the thickness of the refractor 500 may also be gradual increase, which may be designed according to specific curvature or deformation situations of the image that needs to be adjusted.

For example, in at least one embodiment, an interval is between the light incident surface of the refractor 120 and the light exiting surface of the image source component 130, and the distance between the light incident surface of the refractor 120 and the light exiting surface of the image source component 130 is less than or equal to 50 mm, or the distance is not less than 10 mm, or, the refractor 120 is attached to the light exiting surface of the image source component 130.

In the case where an interval is between the refractor 120 and the image source component 130, the refractor 120 may be mounted through a support structure, to be spaced apart from the image source component 130.

For example, in another embodiment, the refractor 120 may be attached to the light exiting surface of the image source component 130, or there may be a certain interval between the refractor 120 and the light exiting surface of the image source component 130; the interval here may be a distance of 50 mm and the like between the light incident surface of the refractor 120 and the light exiting surface of the image source component 130, and there is a gas medium (e.g., air) between the two. The distance between the light incident surface of the refractor 120 and the light exiting surface of the image source component 130 according to the present disclosure is less than a preset value, which can realize a smaller volume of the display device. The image source component 130 and the refractor 120 are spaced apart from each other with a separation distance which may be less than 50 mm, or may also be less than 30 mm, preferably less than 10 mm.

For example, in the case where the refractor 120 is attached to the light exiting surface of the image source component 130, the refractor 120 and the image source component 130 may be connected by transparent optical adhesive.

According to at least one embodiment of the present disclosure, the display device further includes a movement component, the movement component is configured to adjust a relative position between the refractor 120 and the image source component 130, so as to adjust the plane type and/or the tilt angle of the virtual image as needed.

According to at least one embodiment of the present disclosure, the display device further includes a reflector 150, the reflector 150 includes at least one selected from the group consisting of a flat mirror, a curved mirror, a non-spherical mirror, and a spherical mirror, and the main function of the reflector 150 is reflecting the image light emitted by the image source to the amplifier component 140. By providing the reflector 150, the HUD volume can be reduced. But the reflector 150 is not necessary and may be omitted.

According to at least one embodiment of the present disclosure, the present disclosure discloses an image source device (or an image source) including an image source component 130 and a refractor 120, image light emitted by the image source component 130 is incident into the refractor 120, and light emitted from different positions on at least a part of the light exiting surface of the refractor 120 have different optical distances after passing through the refractor 120. For example, by using the refractor 120 with different thicknesses at different positions, the optical distances of the image light of the different positions may be different; or, thicknesses of the gas medium layer in different positions between the refractor 120 and the image source component may be different, in this way, even if the thicknesses in all positions of the refractor 120 are the same, optical distances of the different positions may also be different.

In some embodiments, at least one of the distance between at least a part of the light exiting surface of the refractor 120 and the light incident surface of the refractor 120 and the refractive index of the refractor 120 gradually changes.

The area of the light incident surface of the refractor is larger than the area of the light exiting surface of the image source component, and the light incident surface of the refractor is attached to the light exiting surface of the image source component; or, the image source device may further include a transparent protective element located between the refractor 120 and the image source component 130.

According to at least one embodiment of the present disclosure, the present disclosure discloses an image source device including an image source component 130 and a refractor 120, image light emitted by the image source component 130 is incident into the refractor 120; the area of the light incident surface of the refractor is larger than the area of the light exiting surface of the image source component, and the light incident surface of the refractor is attached to the light exiting surface of the image source component; or, the image source device further includes a transparent protective element located between the refractor 120 and the image source component 130.

For example, the thickness and/or the refractive index of the refractor 120 gradually change along a direction from one side to the other side of the refractor 120; and/or, the thickness and/or the refractive index of the refractor 120 gradually change along the direction from inside of the refractor 120 to the edge of the refractor 120.

The thickness of at least a part of the refractor 120 gradually changes along at least one direction, and/or, at least a part of the contour lines of the refractor 120 is at least one selected from the group consisting of a straight line, a curved line, and a broken line, and/or, the refractive index of at least a part of the refractor 120 gradually changes along at least one direction. The horizontal distance between adjacent contour lines is constant or gradually changes.

The refractor 120 is in a triangular structure (as shown in FIG. 14 and FIG. 15A to FIG. 15B), a U-shaped structure (as shown in FIG. 17 to FIG. 18), or a dustpan-shaped structure (as shown in FIG. 19). The dustpan shape may be understood as a shape in which both a first side surface and a top surface of the refractor 120 have openings, and thicknesses of the other three side surfaces gradually decrease towards the center along the thickness direction.

FIG. 14 shows a schematic diagram of a refractor with a triangular structure. As shown in FIG. 14, both the light exiting surface and the light incident surface of the refractor 120 are flat planes. Along a direction from one end to the other end of the refractor 120, the thickness in the vertical direction gradually decreases, and such gradual change implements continuous impact on the image light incident to the refractor 120, forming a tilted virtual image plane and achieving a continuous zoom effect.

FIG. 15A shows a schematic diagram of another refractor. FIG. 15B shows a schematic planar view of the light exiting surface of FIG. 15A. As shown in FIG. 15A and FIG. 15B, the light incident surface of the refractor 120 is a flat surface, and the light exiting surface is a concave surface. Along a direction from one end of the refractor 120 to the other end of the refractor 120, the thickness in the vertical direction gradually decreases, and such gradual change is suitable for a scene in which portions of the virtual image that correspond to two sides of the refractor 120 extend and bend toward outside. A shape of the light exiting surface of the refractor 120 from the top view may be a conical shape or a trapezoidal shape.

FIG. 17 shows a schematic diagram of further another refractor. As shown in FIG. 17, the thickness of the refractor 120 gradually increases from inside towards the edge of the refractor 120. That is, a middle portion of the refractor 120 is concave downwards, and by applying influence on the image light, a three-dimensional virtual image gradually bending along a direction from the middle to peripheral edges around the middle is formed, which is fitted to the corresponding real scene. The refractor 120 may have a thickness which is thin at the center and gradually increases towards the periphery around the center, or may also have a thickness which is thin at the edges and gradually increases towards the center.

FIG. 18 shows a schematic diagram of a U-shaped refractor. As shown in FIG. 18, the thickness of the refractor 120 gradually increases in a direction from the middle towards two sides. By applying influence to the image light, a three-dimensional virtual image gradually bending along the direction from the middle towards two sides is formed, which is fitted to the corresponding real scene.

FIG. 19 shows a schematic diagram of a dustpan-shaped refractor. As shown in FIG. 19, the refractor 120 has a dustpan-shaped structure; both one side surface and the top surface of the refractor 120 have openings, and thicknesses of the other three side surfaces gradually decrease along a direction from the periphery around the center towards the center.

According to one embodiment of the present disclosure, the refractive index of the refractor 120 is greater than the refractive index of air. Refractive indices at all positions of the refractor 120 are the same, or a difference between the maximum refractive index and the minimum refractive index of the refractor 120 is less than a preset threshold, and the threshold may be determined as needed, for example, 0.5. The refractor 120 has a light incident surface and a light exiting surface; and distances from different positions on the light exiting surface of the refractor 120 to the corresponding positions on the light incident surface match the imaging distances in corresponding positions in the virtual image.

According to at least one embodiment of the present disclosure, the image source component 130 includes an image source display, at least part of the image light emitted by the image source display is incident into the refractor 120; or, the image source component 130 includes at least two image source displays, and at least part of the image light emitted by the at least two image source displays is incident into the refractor 120.

The image source may be any device capable of forming image light; the image source may be a monochrome image source, or may also be a color image source, for example, may be an image source capable of emitting mixed RGB light, for example, a light emitting diode (LED) display or a liquid crystal display (LCD), etc. For example, the image source component 130 includes a backlight source and a display screen, the display screen may be a liquid crystal display (LCD), a digital light processing (DLP) apparatus, or a liquid crystal on silicon (LCOS) display capable of emitting a virtual image or a real image. The image source according to the present disclosure may adopt a transmissive liquid crystal display (LCD).

According to the embodiment of the present disclosure, the display device is a display device whose layout matches a visible region of the reflective imaging portion 200, which can further increase an area of the virtual image and provide a better viewing experience.

For example, the head up display system according to the present disclosure has a multi-level imaging system, that is, it is provided with an HUD for large-scale imaging; layout of the HUD for large-scale imaging matches a visible region of the windshield, so that an image presented by light emitted by the HUD for large-scale imaging may cover the visible region of the windshield; for example, the image presented by the light emitted by the HUD for large-scale imaging may cover more than 40% of the region of the windshield, and may further cover more than 50%, more than 60%, more than 70%, more than 80%, or more than 90% of the region of the windshield as needed. As compared with the traditional HUD based on a freeform reflective mirror and having a smaller field of view (FOV) in related technologies, the layout of a plurality of light sources in the HUD for large-scale imaging matches the visible region of the windshield, so that light emitted by the HUD for large-scale imaging can display an image covering the visible region of the windshield, which achieves an objective of displaying an image in any position within the visible region of the windshield, so that richer contents can be displayed through the HUD for large-scale imaging, improving use experience of the HUD.

According to at least one embodiment of the present disclosure, the image source component 130 of the display device includes a light source portion including a plurality of light sources and a transparent collimation portion, and light emitted by the plurality of light sources passes through the transparent collimation portion; each light source of at least part of the plurality of light sources is not provided with a reflective structure for reflecting light emitted by the light source, and the reflective structure is, for example, a reflective cup or a reflective plate.

According to at least one embodiment of the present disclosure, the image source component 130 of the display device includes a light source portion including a plurality of light sources and a transparent collimation portion, and light emitted by the plurality of light sources passes through the transparent collimation portion, and at least a continuous gas medium layer is included between a light source layer in which the plurality of light sources are located and a collimation layer in which the transparent collimation portion is located.

According to at least one embodiment of the present disclosure, light emitted by the light source is directly incident into the transparent collimation portion; or, the image source component includes a direction control member, the direction control member includes a transparent collimation portion and a plurality of transparent condenser portions, light emitted by a light source corresponding to the transparent condenser portion passes through the transparent condenser portion and then passes through the transparent collimation portion; the plurality of transparent condenser portions are located in the condenser layer, and a side of the condenser layer that faces the transparent collimation portion is a continuous gas medium layer.

According to at least one embodiment of the present disclosure, light emitted from the condenser portion is directly incident into the transparent collimation portion;

and/or, the transparent condenser portion has a groove that accommodates a corresponding light source module; and/or, the transparent condenser portion is attached to the corresponding light source module; and/or, the light exiting surface of the transparent condenser portion is a convex face protruding along a direction away from the corresponding light source module; and/or, the condenser portion is a planoconvex lens.

According to at least one embodiment of the present disclosure, the light exiting surface of the transparent condenser portion is a protruding parabolic surface, and the light source module is embedded inside the transparent condenser portion and located at the focal point of the parabolic surface; or, the light exiting surface of the transparent condenser portion is a protruding circular arc surface, and the light source module is embedded inside the transparent condenser portion and located at the focal point of the circular arc surface; or, the light exiting surface of the transparent condenser portion includes a first light exiting curved surface and a second light exiting side surface, the first light exiting curved surface is a protruding parabolic surface, and the light source module is embedded inside the transparent condenser portion and located at the focal point of the parabolic surface; or, the light exiting surface of the transparent condenser portion includes a first light exiting curved surface and a second light exiting side surface, the first light exiting curved surface is a protruding circular arc surface, and the light source module is embedded inside the transparent condenser portion and located at the focal point of the circular arc surface.

According to at least one embodiment of the present disclosure, the display device is configured to emit image light including at least one spectral band within a visible light waveband; the reflective imaging portion 200 is configured to reflect image light to form a virtual image; the reflective imaging portion 200 includes a transparent substrate and a selective transflective element provided on at least one surface of the transparent substrate; the selective transflective element is configured to have a reflectance to at least part of the image light greater than a reflectance to light of the visible light waveband except the image light, and/or, a transmittance to at least part of the image light less than a transmittance to light of the visible light waveband except the image light.

When the existing display device controls the direction of light emitted by the light source, an opaque housing arranged around the light source is usually adopted to control the direction of the light emitted by the light source, for example, a hollow reflective cup. However, controlling the direction of the light through the opaque housing may result in poor uniformity of the virtual image, and thus image quality cannot be guaranteed, and the opaque housing may also affect heat dissipation of the light source.

According to at least one embodiment of the present disclosure, the present disclosure disclosed a backlight module, the backlight module includes a plurality of light source modules and a transparent collimation portion as described above, and light emitted by the plurality of light source modules passes through the transparent collimation portion; the transparent collimation portion includes at least one collimation member, the at least one collimation member is located in a collimation layer; the plurality of light source modules are located in a light source layer; and a region between the light source layer and the collimation layer includes at least a continuous gas medium layer.

At least some light source modules may not be provided with the reflective cup, which is favorable for heat dissipation of the light source modules. For example, the gas medium layer is adjacent to the collimation layer and the light source layer, and therefore, light emitted by the light source modules passes through the gas medium layer and then is directly incident into the collimation member; or, the gas medium layer is adjacent to a condenser layer including a plurality of transparent condenser portions and adjacent to the collimation layer, and therefore, light emitted by the light source modules passes through the transparent condenser portions and the gas medium layer and then is directly incident into the collimation member. For example, the gas medium layer may be air or other gases.

For example, the center of the collimation member is aligned with the center of the corresponding light source module.

For example, the collimation member is a convex lens or a Fresnel lens, and the collimation member can reduce a divergence angle of the light passing therethrough.

According to at least one embodiment of the present disclosure, the image light include light of at least one spectral band with a first polarization characteristic; the selective transflective element is further configured to have a reflectance to light of part of the spectral band or each spectral band in light with the first polarization characteristic among at least part of image light greater than a reflectance to light of a visible light waveband and light except the image light and light of at least one spectral band with a second polarization characteristic, and/or, have a reflectance to light of part of the spectral band or each spectral band in light with the first polarization characteristic among at least part of image light less than a reflectance to light of a visible light waveband and light except the image light and light of at least one spectral band with a second polarization characteristic; and the first polarization characteristic is different from the second polarization characteristic.

According to at least one embodiment of the present disclosure, the image light include at least three spectral bands within the visible light waveband; and the peak width at half-height of each of the three spectral bands is not greater than 60 nm.

According to at least one embodiment of the present disclosure, an image generation portion 20 of the image source component 130 usually adopts light of a target waveband to realizing imaging, and the target waveband includes at least one spectral band; for example, the image generation portion 20 may adopt light of colors in three wavebands, namely, red, green, blue (RGB) to realizing imaging. In the case where the image generation portion 20 includes a liquid crystal panel, the image generation portion 20 is capable of emitting light with a specific polarization characteristic, for example, light with the second polarization characteristic; moreover, a transflective film 31 is capable of reflecting light with the second polarization characteristic within the target waveband; the transflective film 31 has a higher reflectance to the light with the second polarization characteristic of at least one spectral band and a higher transmittance to other light, for example, to light with the first polarization characteristic within the target waveband and other light except light in the target waveband (including light with the first polarization characteristic and light with the second polarization characteristic). The transflective film 31 is capable of reflecting most of the light emitted by the image generation portion 20 to an observation region, and most of the external ambient light may also be incident into the observation region; for example, light with the first polarization characteristic in almost all wavebands can pass through the transflective film 31 to reach the observation region, allowing the user to view external objects normally.

According to at least one embodiment of the present disclosure, the target waveband includes at least one spectral band, for example, a peak width at half-height of the at least one spectral band may be less than or equal to 60 nm.

Figure 22:
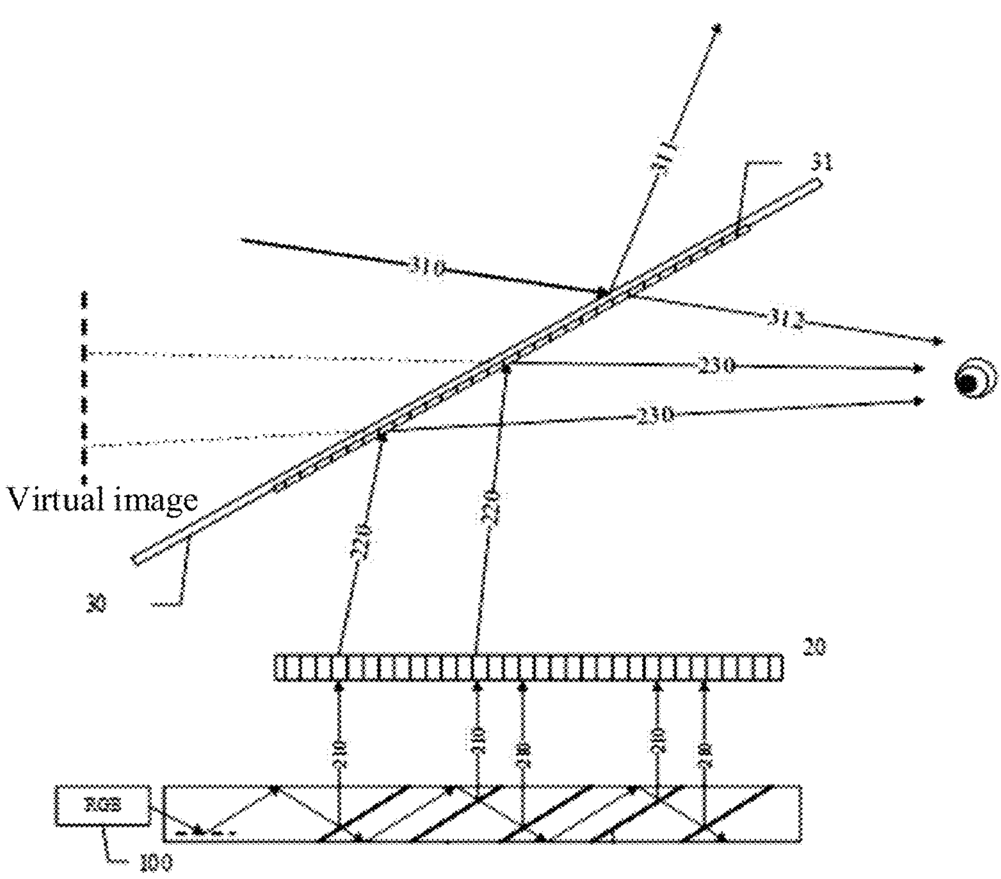
FIG. 22 shows a structural schematic diagram of the display device generating multi-waveband image light provided by at least one embodiment of the present disclosure.

FIG. 22 shows a structural schematic diagram of multi-waveband image light of a display device provided by at least one embodiment of the present disclosure.

According to some embodiments of the present disclosure, referring to FIG. 22, for example, light with the first polarization characteristic are light of a P-polarization state (hereinafter briefly referred to as P-polarized light), and light with the second polarization characteristic are light having an S-polarization state (hereinafter briefly referred to as S-polarized light); a light guide apparatus is capable of emitting light 210 like the image generation portion 20, and the light are P-polarized light; in the case where the light emitted by the light source 100 is RGB light, the light 210 is RGB P-polarized light. The image generation portion 20 is capable of converting the light 210 into light 220, the light 220 is the imaging light for imaging, and the imaging light is S-polarized light of RGB; the transflective film 31 is capable of reflecting the S-polarized light of RGB and transmitting other light. For example, the transflective film 31 has a higher reflectance (e.g., a reflectance in a range of about 70% to 90%) to red light, green light and blue light that are in the S-polarization state, while has a higher transmittance (e.g., a transmittance of about 70% to 90%) to light in other wavebands as well as red light, green light and blue light that are in the P-polarization state.

As shown in FIG. 22, the image generation portion 20 emits RGB light 220 in the S-polarization state, and the transflective film 31 has a higher reflectance to the light 220, so most of the light 220 emitted by the image generation portion 20 may be reflected by the transflective film 31 into light 230, and the light 230 is reflected to the observation region, which improves imaging brightness; moreover, the vast majority of light in the external ambient light 310 may be transmitted normally, thereby observation of the external environment cannot be affected; for example, there are also objects in the external environment that mainly emit light in the target waveband, for example, a traffic signal light that emit red light and green light, etc.; the waveband of the light generated by the signal light and similar apparatuses is close to or coincides with the target wavebands of RGB, etc., some light 311 with the second polarization characteristic (e.g., the S-polarization state) among the light emitted by the signal light and similar apparatuses is reflected by the reflective film 31, but some light 312 with the first polarization characteristic (e.g., the P-polarization state) among the light emitted by the signal light and similar apparatuses can still pass through the reflective film 31 with a high transmittance, and the user in the observation region can still see the light emitted by the signal light and the like normally. For example, the light 312 may also include light of other wavebands except the wavebands of RGB.

The above-described first polarization characteristic may also be an S-polarization state, or may also be other polarization states such as circular polarization, elliptical polarization, etc., which will not be limited by this embodiment; and, the above-described RGB are respectively abbreviations for red light, green light, and blue light, which, for example, may be red light, green light, and blue light distributed in a continuous waveband, or may also be red light, green light, and blue light distributed discontinuously, for example, a peak width at half-height of the above-described light is not greater than 60 nm, a peak position of a blue ray wavelength may be in a range of 410 nm to 480 nm, a peak position of a green ray wavelength may be in a range of 500 nm to 565 nm, and a peak position of a red ray wavelength may be in a range of 590 nm to 690 nm.

In at least one embodiment of the present disclosure, the display device is configured to allow a user to see at least one naked eye 3D virtual image through amplified light for imaging; or, the display device is configured to allow the user to observe a plurality of virtual images at the same moment or at different moments through an eyebox of the display device; the display device is configured to allow the user to see at least one naked eye 3D virtual image through at least one virtual image among the plurality of virtual images, which is an image formed by the amplified light after the refracted light is processed by the amplifier component 140; and/or, a naked eye 3D virtual image (at least one virtual image among the plurality of virtual images) used for implementing naked eye 3D display includes a left eye virtual image region and a right eye virtual image region; the display device is configured to emit left eye light corresponding to the left eye virtual image region received by the left eye of the same user and right eye light corresponding to the right eye virtual image region received by the right eye of the same user, so that the user may see the naked eye 3D virtual image through the left eye light and the right eye light.

The left eye virtual image region and the right eye virtual image region are located on the same imaging plane (i.e., imaging distances are substantially equal); and the left eye light and the right eye light is emitted from the same image source, so that the left eye of the user can see a pattern in the left eye virtual image region and the right eye can see a pattern in the right eye virtual image region. Due to a structure of the human eyes and a visual processing principle of human brain, the user can see the 3D effect which can also be referred to as naked eye 3D.

In at least one embodiment of the present disclosure, the display device is configured to allow the user to observe a plurality of virtual images through the eyebox of the display device at the same moment or at different moments; at least two virtual images among the plurality of virtual images have different distances to the eyebox; at least one virtual image is perpendicular to the horizontal direction, and at least the other virtual image has an included angle greater than or less than 90 degrees with the horizontal direction. The horizontal direction is a direction perpendicular to the plane on which the eyebox is located, or a direction parallel to the ground on which the transportation equipment adopting the display device travels in real time.

Figure 23:
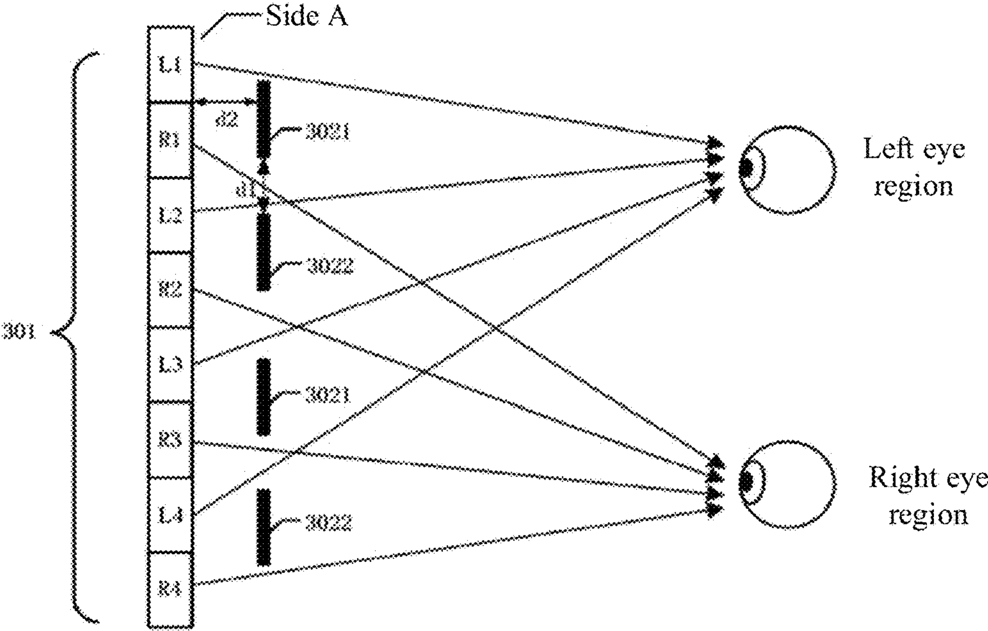
FIG. 23 shows a structural schematic diagram of a light barrier element provided by an embodiment of the present disclosure.

FIG. 23 shows a structural schematic diagram of a light barrier element provided by at least one embodiment of the present disclosure.

According to the embodiment of the present disclosure, as shown in FIG. 23, it is illustrated by taking the case that an image source 301 includes eight columns of image source units, two first blocking units, and two second blocking units as an example. There is a distance d2 between the light barrier and the image source 301, both the first blocking unit 3021 and the second blocking unit 3022 can block light, so second light emitted by some of the image source units cannot reach the left eye region, and only first light emitted by the image source units L1, L2, L3 and L4 can be viewed in the left eye region; and similarly, only the second light emitted by the image source units R1, R2, R3 and R4 can be viewed in the right eye region. The first blocking unit 3021 allows the first light, for example, the first light emitted by the image source units L1, L2, L3 and L4, to be incident into a first designated region; the second blocking unit allows the second light, for example, the second light emitted by the image source units R1, R2, R3 and R4, to be incident into a second designated region; by separating the visible virtual images of the left eye and the right eye, stereoscopic imaging can be further implemented. Sizes of the first blocking unit 3021 and the second blocking unit 3022, as well as a position relationship between the first blocking unit 3021 and the second blocking unit 3022, are specially designed after precise calculation, to ensure imaging at a specific position.

In at least one embodiment of the present disclosure, the amplifier component 140 includes a reflection portion, the reflection portion magnifies the refracted light and reflects the same towards an imaging reflection portion; and/or, the amplifier component 140 includes a lens, and the lens magnifies the refracted light and emits the same towards the imaging reflection portion.

For example, the amplifier component 140 may be any optical structure capable of amplifying an image, which is not limited in this embodiment. For example, the amplifier component 140 may be a concave mirror, a freeform mirror, and so on.

For example, the amplifier component 140 is a concave reflective mirror, and in this case, a surface of the concave reflective mirror that is close to the display region is a concave curved surface. The arrangement of the curved reflective mirror can allow the head up display to have a longer virtual imaging distance and a larger imaging size, and the curved reflective mirror may also cooperate with the imaging window (e.g., the windshield) to eliminate virtual image distortion caused by the imaging window.

In addition to the foregoing technical solution of forming a gradual zoom virtual image through the refractor 120, gradual zoom of the virtual image may also be implemented through a flexible image source. For example, a projector may be adopted as the image source, to control a shape of the virtual image by controlling the shape of the screen of the projector, and so on.

In at least one embodiment of the present disclosure, the display device may also be configured with a zoom curved reflective mirror; and the curvature of the zoom curved reflective mirror may be adjusted by an electric field, to change the focal length of the zoom curved mirror.

According to an exemplary embodiment of the present disclosure, the present disclosure discloses a display method including: causing at least part of the image light emitted by the image source component 130 to be incident into the refractor 120; causing at least part of the refracted light emitted from the refractor 120 to be incident into the amplifier component 140, in which the amplifier component 140 is configured to amplify the incident refracted light to emit amplified light for imaging; the image light corresponding to different positions on at least part of the light exiting surface of the refractor 120 have different optical distances within the refractor 120, and/or, different optical distances of the image light corresponding to different positions on at least part of the light exiting surface of the refractor 120 have an association relationship with an image formed by the amplified light emitted from the amplifier component 140 relative to a change in the reference image; and the reference image is an image formed by the amplified light emitted from the amplifier component 140 assuming that no refractor 120 is provided.

By providing the refractor 120, gradual zoom of the virtual image (e.g., change in the plane type and the tilt angle, etc.) can be implemented, allowing the virtual image to better fuse with the external environment visually, which allows the observer to see a clear visual effect after fusion, avoids conflicts in visual convergence adjustment and improves use experience of the HUD.

According to the embodiment of the present disclosure, the refractor 120 is a tilt angle adjustment type refractor and/or an image plane shape adjustment type refractor; and/or, the display device further includes a reflective imaging portion 200, that is, the display device includes the processing portion of the refractor 120 and further includes the reflective imaging portion 200, the amplified light obtained by processing the refracted light through the amplifier component is reflected by the reflective imaging portion 200 to the eyebox to form the virtual image; the amplified light is reflected by the reflective imaging portion 200 to form a reference image assuming that there is no refractor 120; the reference image has a first included angle with the horizontal direction, the above-described virtual image has a second included angle with the horizontal direction, and the second included angle is different from the first included angle, that is, the refractor 120 is configured to adjust the first included angle between the reference image and the horizontal direction into the second included angle between the virtual image and the horizontal direction, so as to utilize the refractor 120 to obtain an ideal virtual image and solve the technical problem of defects in the reference image; please refer to the foregoing description of the technical problem for details. And/or, the above-described reference image is in a first image plane shape, the refractor 120 is configured to cause the virtual image to be in a second image plane shape; the second image plane shape is different from the first image plane shape; the first image plane shape is a flat plane, and the second image plane shape is a flat plane or a curved plane, or, the first image plane shape is a curved plane, and the second image plane shape is a flat plane or a curved plane.

According to the embodiment of the present disclosure, in the case where the refractor 120 is configured to adjust the first included angle between the reference image and the horizontal direction into the second included angle between the virtual image and the horizontal direction, a cross section of the tilt angle adjustment type refractor is a polygonal structure; the polygonal structure may adopt a right-angled triangle structure, a rectangular structure, or a right-angled trapezoid structure; and/or In the case where the refractor 120 is configured to adjust the first image plane shape of the reference image into the second image plane shape of the virtual image, and the second image plane shape is different from the first image plane shape, the light exiting surface of the image plane shape adjustment type refractor is a flat plane or a curved plane.

According to an exemplary embodiment of the present disclosure, the present disclosure discloses a head up display apparatus including: the above-described display device, the above-described refractor 120, or the above-described image source device.

According to an exemplary embodiment of the present disclosure, the present disclosure discloses a transportation equipment, including the above-described display device, the above-described refractor 120, the above-described image source device, or the above-described head up display apparatus. For example, the windshield of the transportation equipment is used as the reflective imaging portion 200.

Light from the display device is projected onto the windshield to display an image. The light is reflected by the windshield and then is incident into the eyebox. The eyebox is located on one side of the windshield, and the user may assume that the formed virtual image displayed by the display device is located on the other side of the windshield. A fusion degree between the displayed image and the actual environment is improved through the above-described display device, which avoids conflicts between the users'parallax and visual convergence adjustment when using the transportation equipment.

According to the embodiment of the present disclosure, light emitted by the light source module are directed by a direction control module and then is incident into the light modulation layer, so that the light modulation layer may emit directional imaging light towards an eyebox range during operation, and the directional imaging light converge to the eyebox range, thereby improving brightness of the directional imaging light.

Due to capability of converging the directional imaging light, in the example, the display device has particularly high brightness that allows the driver to observe the virtual image formed by the reflective imaging portion 200, and the display device can possess a larger area that allows the user (e.g., the driver) to view a larger range of image formed as reflected by the reflective imaging portion 200. For example, the display device may be tiled on an IP station surface of the vehicle.

The reflective imaging portion 200 according to the present disclosure may be a windshield window (e.g., a windshield) of the transportation equipment, for example, a windshield window made of a glass material, or a reflective film on the inside of the windshield window, etc.; the reflective film is capable of reflecting imaging light emitted by the display system without affecting the driver's observation of objects or scenes outside the transportation equipment through the reflective film.

After the light from the image source are projected onto the reflective imaging portion 200, large-scale imaging may be implemented, that is, an imaging region of the light from the image source on the reflective imaging portion 200 may occupy most of the reflective imaging portion 200. Usually, a field of view (FOV) may be used for measuring the size of the virtual image. For example, with respect to the virtual image of large-scale imaging, the driver's eye position for viewing the image has a range of a horizontal field of view greater than or equal to 15 degrees, for example, not less than 20 degrees, for example, not less than 25 degrees, for example, not less than 30 degrees, for example, between 15 degrees and 100 degrees, and has a range of a vertical field of view greater than or equal to 5 degrees, for example, not less than 15 degrees, for example, not less than 20 degrees, for example, not less than 25 degrees, for example, between 5 degrees and 30 degrees. This can increase the field of view of the head up display system, thereby implementing imaging of ultra-large field of view with low power consumption. The above-described "horizontal" and "vertical" are two mutually perpendicular directions; taking the vehicle coordinate system as an example, the above-described "horizontal" may refer to a vehicle width direction in the vehicle coordinate system, and the above-described "vertical" may refer to a vehicle height direction in the vehicle coordinate system.

In the case of adding the refractor 120, due to a change in the light path by the refractor 120, a part of the image light that could have been reflected into the eyebox may not be capable of entering the eyebox, which affects the effect of the virtual image seen by the user. In order to avoid this problem, in the case where a refractor 120 is provided between the image source component 130 and the amplifier component 140 that deflects the light, and in the case where the refractor 120 is a non-rectangular refractor, backlight compensation may be performed, so that the image light passing through the refractor 120 can still be reflected into the eyebox 110.

The "eyebox region" refers to a region range within which the user's eyes can see the image formed by the display system; moreover, the "eyebox range" has a certain size, and the user's eyes can move within this region range in which the image can always be viewed.

The present disclosure provides a light compensating method of a display device, including: causing a light compensation component included in an image source to emit light source light; causing a light modulation layer included in the image source to convert incident light-source light into image light, wherein the image light is emitted from a light exiting surface of the image source; and causing a refractor to refract at least part of the image light emitted from the light exiting surface of the image source to emit refracted light; and the light compensating method further includes: performing compensation adjustment on initial light emitted by a light source to form light-source light with a first refraction, so that the first refraction of the light-source light at least partially offsets a second refraction of the image light caused by the refractor.

The present disclosure provides a light compensating method of a display device, including: causing a light compensation component included in an image source to emit light-source light; causing a light modulation layer included in the image source to convert incident light-source light into image light, wherein the image light is emitted from a light exiting surface of the image source; refracting, by a refractor, at least part of the image light emitted from the light exiting surface of the image source to emit refracted light; and using a reflective imaging portion to reflect the incident refracted light so that the refracted light is incident into an eyebox of the display device; the light compensating method further includes: performing compensation adjustment on initial light emitted by a light source to form light-source light with a first refraction, wherein the first refraction of the light-source light at least partially offsets a second refraction of the image light caused by the refractor, so that the incidence effect of the refracted light relative to the eyebox is better than the incidence effect of the refracted light relative to the eyebox generated in the case of assuming that no compensation adjustment is performed.

In some embodiments, the refractor is attached to the light exiting surface of the image source; or, at least a part of the light incident surface of the refractor is spaced apart from at least a part of the light exiting surface of the image source.

The light compensation component includes a light source, the light source includes a light emitting element capable of emitting light to emit initial light and provide a source of light for imaging. In some embodiments, the performing compensation adjustment on initial light emitted by a light source includes: causing the light-source light obtained by performing light compensation on the initial light to be incident into the light modulation layer; and/or, causing the initial light emitted by the light source included in the light compensation component to form the light-source light after being processed by the direction control member included in the light compensation component, and adjusting, by the direction control member, a propagation direction of the light-source light, to implement compensation adjustment.

In some embodiments, the causing the light-source light obtained by performing light compensation on the initial light to be incident into the light modulation layer, includes: causing the light-source light to undergo the first refraction, by causing the light-source light emitted by the light compensation component to be incident into different positions of the light incident surface of the light modulation layer with at least one refraction angle, the refraction angle being an included angle between the light-source light and a normal line of the light incident surface of the light modulation layer.

In some embodiments, causing the light-source light obtained by performing light compensation on the initial light to be incident into the light modulation layer includes: causing the light-source light to undergo the first refraction to form the light source light emitted from the light compensation component, by causing the initial light to be incident into different positions of the light incident surface of the light modulation layer with at least one refraction angle, after being processed by the light compensation component included in the image source, the refraction angle being an included angle between the light-source light and the normal line of the light incident surface of the light modulation layer.

In some embodiments, the light compensation component includes at least one selected from the group consisting of a refraction layer, an eccentric Fresnel lens, and a reflective element; the at least one selected from the group consisting of the refraction layer, the eccentric Fresnel lens, and the reflective element is configured to cause the light-source light emitted by the light compensation component to have the first refraction, that is, to cause the initial light emitted by the light source to undergo the first refraction to form the light source light emitted from the light compensation component.

In some embodiments, the light source light emitted from at least some different positions of the light exiting surface of the refraction layer have different refraction angles.

In some embodiments, the refraction layer includes a plurality of tooth-shaped refractive structures; the initial light emitted by the light source undergo the first refraction after passing through the tooth-shaped refractive structure, to form the light-source light with the first refraction.

In some embodiments, the reflective element includes a first sub-reflective element and a second sub-reflective element; the first sub-reflective element is configured to reflect the initial light emitted by the incident light source to the second sub-reflective element; and the second sub-reflective element is configured to reflect the initial light incident thereon, so that the initial light undergo the first refraction to form the light-source light with the first refraction.

In some embodiments, the shape of the light compensation component and the shape of the refractor are complementary, so that the first refraction of the light-source light at least partially offsets the second refraction of the image light caused by the refractor.

In some embodiments, the direction control member includes a reflective wall configured to reflect the initial light; and there is a first tilt angle between an extension direction of the reflective wall and the light exiting surface of the light modulation layer, to cause the light-source light to undergo the first refraction.

At least one embodiment of the present disclosure further provides an image source, and the image source includes an image source component and a light compensation component, the image source component includes a light modulation layer; the light compensation component is configured to emit light-source light, the light-source light is incident into the light modulation layer, the light modulation layer is configured to convert the incident light-source light into image light and emit the image light from a light exiting surface of the image source, and the image light propagate to the eyebox to form a virtual image; the light compensation component is configured to cause the light-source light to be incident onto a light incident surface of the light modulation layer with at least one refraction angle; and the refraction angle is an included angle between the light-source light and a normal line of the light incident surface of the light modulation layer.

The display device provided by at least one embodiment of the present disclosure includes any one of the image sources provided by the embodiments of the present disclosure.

For example, in some embodiments, the image source is used for light compensation of the display device, the display device includes a refractor, and the refractor is configured to perform a refraction processing on the image light and then emit refracted light; the first refraction of the light-source light emitted by the light compensation component at least partially offsets the second refraction of the image light caused by the refractor, to cause the image light emitted from the refractor to be incident into the set eyebox.

For example, in some embodiments, the display device further includes a reflective imaging portion, the reflective imaging portion is configured to reflect the incident refracted light into the eyebox of the display device; and the incidence effect of the refracted light relative to the eyebox is better than the incidence effect of the refracted light generated in the case of assuming that the light-source light is perpendicularly incident onto the light incident surface of the light modulation layer relative to the eyebox.

For example, in some embodiments, the light compensation component is configured to have a first angle relative to the light modulation layer, so that the light-source light emitted by the light compensation component is incident into different positions on the light incident surface of the light modulation layer with at least one refraction angle; and the refraction angle is an included angle between the light-source light and the normal line of the light incident surface of the light modulation layer.

For example, in some embodiments, the light compensation component emits light-source light; the light compensation component is configured to perform light compensation on the light-source light incident thereon, so that the light-source light emitted by the light compensation component is incident into different positions of the light incident surface of the light modulation layer with at least one refraction angle, causing the light-source light to undergo the first refraction; and the refraction angle is an included angle between the light-source light and the normal line of the light incident surface of the light modulation layer.

For example, in some embodiments, the light compensation component includes a light source and a direction control member, the light source includes a light emitting element capable of emitting light to emit initial light and providing a source of light for imaging. The direction control member is configured to control a propagation direction of the initial light, so that the light-source light emitted after being processed by the direction control member have the first refraction angle. For example, the direction control member is configured to perform at least one selected from the group consisting of convergence, diffusion and collimation on the initial light emitted by the light source; the light compensation component is arranged between the light source and the direction control member; or, the light compensation component is arranged between the direction control member and the light modulation layer.

For example, in some embodiments, the light source is configured to have a first tilt angle with the light exiting surface of the light modulation layer, so that the light-source light undergo the first refraction; or, the direction control member further includes a reflective wall configured to reflect the initial light; and an extension direction of the reflective wall has a first tilt angle with the light exiting surface of the light modulation layer, so that the initial light undergo the first refraction to form the light-source light.

For example, in some embodiments, the light compensation component includes at least one selected from the group consisting of a refraction layer, an eccentric Fresnel lens, and a reflective element; the at least one selected from the group consisting of the refraction layer, the eccentric Fresnel lens, and the reflective element is configured to cause the initial light to undergo the first refraction to form the light-source light.

For example, in some embodiments, the refraction layer includes a plurality of tooth-shaped refractive structures; and the initial light undergo the first refraction after passing through the tooth-shaped refractive structure, to form the light-source light.

In some embodiments, the refractor has a first incident surface and a first exiting surface; the refraction layer includes a plurality of tooth-shaped refractive structures; the tooth-shaped refractive structure includes a second incident surface and a second exiting surface; there is an included angle between the second incident surface and the second exiting surface; a value of the included angle matches a value of an included angle between the first exiting surface and the first incident surface in a corresponding position on the refractor. The term "match" here refers to that the two included angles cooperate with each other to implement preset compensation for the first refraction of the light-source light emitted by the light compensation component and the second refraction of the light-source light in the corresponding position on the refractor, so that the image light finally used for imaging is incident into the preset eyebox.

In other embodiments, the reflective element includes a first sub-reflective element and a second sub-reflective element; the first sub-reflective element is tilted relative to the light source to reflect at least part of the initial light to the second sub-reflective element; the second sub-reflective element is tilted relative to the first sub-reflective element, and the second sub-reflective element is configured to reflect light reflected by the first sub-reflective element to the imaging layer, so that the light reflected by the second sub-reflective element undergo the refraction and form the light source light emitted from the light exiting surface of the light compensation component.

In other embodiments, the light compensation component is arranged at a first angle relative to the imaging layer, so that at least part of the light-source light emitted by the light compensation component is incident onto the light incident surface of the imaging layer with the refraction angle.

For example, in some embodiments, light source light emitted from at least some different positions on the light exiting surface of the refraction layer have different refraction angles.

For example, in some embodiments, the reflective element includes: a first sub-reflective element configured to reflect the incident light-source light, and a second sub-reflective element configured to receive the light-source light reflected by the first sub-reflective element and reflect the light-source light to cause the light-source light to undergo the first refraction.

For example, in some embodiments, the shape of the light compensation component and the shape of the refractor are complementary, so that the first refraction of the light-source light at least partially offsets the second refraction of the image light caused by the refractor.

An inventor of the present disclosure finds that the virtual image of the existing HUD is a flat-plane virtual image that is relatively perpendicular to the horizontal road surface; when the user views some augmented reality (AR) contents of the flat-plane virtual image (which is not limited thereto, and may also be other contents that need to be exhibited), due to limitation that the flat-plane virtual image can only have one virtual imaging distance, there may be a problem that the AR contents on the flat-plane virtual image are not spatially aligned with objects in the real environment, resulting in a problem that imaging contents seen by the left eye and the right eye of the user are inconsistent.

In addition, the virtual image of existing HUD may also lead to a certain deviation between a physical focus distance of the human eye for the image and a perceived distance of the brain's perception of the AR contents (e.g., time difference and/or visual convergence problems). The above-described problems may lead to a poor fusion effect between the imaging contents seen by the user and the real environment, and may cause visual fatigue such as blurred vision and dizziness, resulting in a poor viewing experience for the user.

In some solutions of the present disclosure, in order to solve at least one of the above-described technical problems, a refractor is added to the light path between the image source and the imaging body of the HUD to adjust imaging, so that imaging distances (VIDs) of the formed image (which will be illustrated below by taking the virtual image formed by the HUD as an example, but it is not limited thereto) are different in at least part of different positions, for example, the imaging distances are gradually changed. This may improve a matching relationship between the AR contents in the virtual image and the objects in the environment, thereby alleviating or eliminating parallax and/or visual convergence problems, allowing the AR contents to better fuse with the real environment.

For example, FIG. 24 shows a structural schematic diagram of a display device (the display device is not limited to the existing technology in this embodiment, and is a related technology in the present disclosure). Referring to FIG. 24, the display device 1 includes an image source A, a reflective element B, an amplifier element C, and an imaging body D.

The image source A emits image light (equivalent to that an image source component 100 emits image light according to the embodiment shown in FIG. 1B). As shown in FIG. 24, the image source A emits first image light L1. The first image light L1 is reflected by the reflective element B (the reflective element B is an optional member, and this example is illustrated only by taking the display device including the reflective element B as an example) to the amplifier element C, magnified by the amplifier element C, and then reach the imaging body D.

The first image light L1 is reflected on the imaging body D, and the reflected light fall into a sight region of the user, allowing the user to see a virtual image formed by the first image light L1 in a front region of the imaging body D.

For example, referring to FIG. 24, the imaging body D may be a windshield of a transportation tool/transportation equipment; and the eyebox E is the sight region of the user.

In order to solve the problem of the poor fusion effect between the imaging contents seen by the user and the real environment caused by human eye parallax and/or visual convergence, a refractor F is added on a light path between the image source A and the imaging body D. The refractor F is used for adjusting the optical distance in the propagation process of at least part of the image light reaching the amplifier element C, so that the virtual image formed by the HUD is a gradual zoom image (i.e., VIDs from different positions in the virtual image to the eyebox E are different).

Referring to FIG. 24, the image light emitted by the image source A are refracted by the refractor F and then emitted, forming second image light L2 as shown in FIG. 24. The second image light L2 is reflected by the imaging body D after movement on a certain light path.

The optical distance of the image light refers to an optical distance in a process that the image light emitted from the image source and then propagated to the amplifier element. The optical distance of image light is related to a physical distance propagated by the image light and a refractive index of a propagation medium. Generally, the optical distance is a product of the physical distance propagated by the image light and the refractive index of the propagation medium.

By controlling refractive indices and physical distances of the refractor through which the image light propagates at different positions, the image light emitted from different positions of the image source may have different optical distances, thereby forming a zoom image.

The inventor of the present disclosure finds that in some cases, the refractor F can change the optical distance of the image light, but the refractor F can also cause a direction of a chief light (also referred to as a chief optical axis) of the image light to have a certain refraction.

For example, as shown in FIG. 24, the same image light (e.g., the second image light L2) is selected, assuming no refractor F is provided, a landing point of the second image light L2 on the amplifier element C is obtained as the point M.

In the case where a refractor F is provided, the chief light of the second image light L2 is refracted by the refractor F to generate a certain refraction, so that the landing point of the second image light L2 on the amplifier element C is the point N.

The refraction with such angle may prevent at least part of the image light from reaching a target position on the amplifier element C after passing through the refractor F, thereby preventing the image light from being reflected to a target region, for example, the eyebox E of the user, which causes loss and reduces brightness of the formed virtual image, thereby affecting the imaging effect.

Based on the above-described problems, one aspect of the present disclosure provides a light compensating method used in the display device, which can perform light compensation on light of the image source of the display device, to improve the imaging effect of the display device.

The display device involved in the light compensating method provided by the technical solution of the present disclosure at least includes an image source and a refractor, for example, the display device may further include an amplifier element and an imaging body (e.g., the windshield of the transportation tool/transportation equipment), and the image source may include a light compensation component and a light modulation layer, but it is not limited to this case.

At least one embodiment of the present disclosure further provides an image source, the image source includes the image source component and the light compensation component, the image source component includes an light modulation layer; the light compensation component is configured to emit light-source light, the light-source light is incident into the light modulation layer, the light modulation layer is configured to convert the incident light-source light into the image light and emit the image light from the light exiting surface of the image source; the light compensation component is configured to cause the light-source light to be incident into different positions of the light incident surface of the light modulation layer with at least one refraction angle; and the refraction angle is an included angle between the light-source light and the normal line of the light incident surface of the light modulation layer.

For example, the display device provided by at least one embodiment of the present disclosure includes any one of the image sources provided by at least one embodiment of the present disclosure. For example, the display device further includes the refractor and the processing portion as described above.

FIG. 25 shows a flow chart 1000 of a first light compensating method according to an exemplary embodiment of the present disclosure; the method is applicable for light compensation performed by the image source including the light compensation component and the display device provided by the embodiment of the present disclosure. For example, referring to FIG. 25, the method 1000 includes step S110 to step 140.

In step S110, the display device causes the light source of the light compensation component included in the image source to emit initial light.

In at least one embodiment of the present disclosure, the light compensation component includes a light source; the light source includes a light emitting element; and the light source emits initial light based on an electroluminescence principle.

In step S120, compensation adjustment is performed on the initial light, to cause at least part of the initial light to undergo the first refraction and form light-source light with the first refraction emitted from the light compensation component.

For example, compensation adjustment is performed on the initial light emitted by the light compensation component to obtain the light source light; and the chief light of at least part of the light-source light has the first refraction and has a first refraction angle. The first refraction angle is an included angle between the chief light of the light-source light and the normal line of the light incident surface of the light modulation layer.

In step S130, the display device causes the light modulation layer included in the image source to convert the incident light-source light into image light.

In some examples, an exiting angle of the image light emitted from the light modulation layer is the same as an angle of the light-source light incident into the light modulation layer, but it is not limited to this case.

In at least one embodiment of the present disclosure, the light modulation layer includes a liquid crystal panel; the liquid crystal panel forms the incident light-source light into image light having at least a part of region with a preset pattern or without a pattern. The preset pattern may be any pattern that needs to be displayed, for example, a pattern with driving information such as navigation, fuel level, mileage, or the surrounding environment and road conditions of the driving vehicle, but it is not limited thereto. The image light without a pattern may be image light that display pure background colors.

The liquid crystal panel includes, but is not limited to, a thin film transistor liquid crystal panel, a twisted nematic liquid crystal panel, a multi-quadrant vertically aligned liquid crystal panel, an in-plane switching liquid crystal panel, or an advanced ultra-dimensional field conversion liquid crystal panel, etc.

In step S130, the image light is emitted from the light exiting surface of the image source.

For example, the image light passes through the light modulation layer and then is emitted from the light exiting surface of the image source.

In step 140, the display device causes the refractor to perform a refraction processing on at least part of the image light emitted from the light exiting surface of the image source to emit refracted light.

For example, the refractor refracts at least part of the image light emitted by the image source, causing at least part of the refracted image light to have the second refraction, to form the refracted light.

The refracted light have a second refraction angle relative to its own un-refracted state. For example, image light 1 forms light A1 without being refracted by the refractor (i.e., in an un-refracted state), and image light 1 forms light A2 (also referred to as refracted light) after being refracted by the refractor; and light A2 have a second refraction angle relative to light A1.

In this embodiment, the first refraction of at least part of the light-source light having undergone light compensation adjustment can at least partially offset the second refraction of the image light on the refractor, so that in step 140, the image light have a desired exiting angle after undergoing the second refraction. In other words, by adjusting the light with the first refraction and the second refraction, the light passing through the refractor may propagate along a set angle, so that the light may propagate to the eyebox.

For example, the desired exiting angle is the same as the set exiting angle, the set exiting angle may be an exiting angle of uncompensated light having not been refracted by the refractor; the first refraction angle of the light-source light can offset the second refraction angle of the image light generated as refracted by the refractor. In this way the problem of light path loss caused by deviation of some of the image light from a set path due to refraction by the refractor can be avoided.

In this embodiment, there may be a conjugate relationship between the first refraction angle and the second refraction angle; and the conjugate relationship, for example, may be a relationship in which the first refraction angle and the second refraction angle have an equal value and opposite directions, but it is not limited to this case.

According to the above-described exemplary embodiment, by performing compensation adjustment on the light in the backlight path of the image source, the light may undergo the first refraction which may at least partially offset the second refraction of the image light caused by the refractor, so that finally image light that meet the required preset exiting angle may be emitted, thereby achieving the objective of light compensation.

FIG. 26 shows a flow chart 2000 of a second light compensating method according to an exemplary embodiment of the present disclosure. Referring to FIG. 26, the method 2000 includes step 210 to step 250.

In step 210, the display device causes the light source of the light compensation component included in the image source to emit initial light.

In at least one embodiment of the present disclosure, the light compensation component includes a light source; the light source includes a light emitting element; and the light source emits initial light based on an electroluminescence principle.

In step S220, compensation adjustment is performed on the initial light to cause at least part of the initial light to undergo the first refraction and form light-source light with the first refraction.

For example, compensation adjustment is performed on the initial light emitted by the light source to cause the chief light of at least part of the initial light to undergo the first refraction, so as to form light-source light with the first refraction angle which is emitted from the light exiting surface of the light compensation component. The first refraction angle is an included angle between the chief light of the light-source light and the normal line of the light incident surface of the light modulation layer.

In step S230, the display device causes the light modulation layer included in the image source to convert the incident light-source light into image light. The light modulation layer converts the incident light-source light into image light.

In some examples, an exiting angle of the image light emitted from the light modulation layer is the same as an incident angle of the light-source light incident into the light modulation layer, but it is not limited thereto.

In at least one embodiment of the present disclosure, the light modulation layer includes a liquid crystal panel; the liquid crystal panel forms the incident light-source light into image light having at least a part of region with a preset pattern or without a pattern. The preset pattern may be any pattern that needs to be displayed, for example, a pattern with driving information such as navigation, fuel level, mileage, or the surrounding environment and road conditions of the driving vehicle, but it is not limited thereto. The image light without a pattern may be image light that display pure background colors.

The liquid crystal panel includes, but is not limited to, a thin film transistor liquid crystal panel, a twisted nematic liquid crystal panel, a multi-quadrant vertically aligned liquid crystal panel, an in-plane switching liquid crystal panel, or an advanced ultra-dimensional field conversion liquid crystal panel, etc.

In step S230, the image light is emitted from the light exiting surface of the image source.

For example, the image light passes through the light modulation layer and then is emitted from the light exiting surface of the image source.

In step S240, the display device causes the refractor to perform a refraction processing on at least part of the image light emitted from the light exiting surface of the image source to emit refracted light.

For example, the refractor refracts at least part of the image light emitted by the image source, causing at least part of the refracted image light to have the second refraction, forming refracted light.

The refracted light have a second refraction angle relative to its own un-refracted state (i.e., the image light emitted from the light exiting surface of the image source). For example, image light 1 forms light A1 without being refracted by the refractor (i.e., in an un-refracted state), and image light 1 forms light A2 (also referred to as refracted light) after being refracted by the refractor; and light A2 have a second refraction angle relative to light A1.

In step S250, the reflective imaging portion reflects the incident refracted light to cause the refracted light to be incident into the eyebox of the display device.

For example, the refracted light emitted from the refractor is incident into the reflective imaging portion (e.g., a windshield of a vehicle mounted with the light source or the display device). The reflective imaging portion reflects the refracted light incident into the reflective imaging portion to cause the refracted light to be incident into the eyebox of the display device.

The eyebox is a sight region of the user, so that the user can see an image formed by the refracted light within the sight region.

In at least one embodiment of the present disclosure, the light-source light having the above-described first refraction is obtained by performing compensation adjustment on the initial light emitted by the light source, so that the incidence effect of the refracted light formed by the light-source light obtained by performing compensation adjustment on the initial light in step S220 relative to the eyebox (for ease of description, such case is denoted as compensated incidence) is better than the incidence effect of the refracted light relative to the eyebox generated in the case of assuming that no compensation adjustment is performed (e.g., the chief light of the light-source light is perpendicularly incident into the light incident surface of the light modulation layer) (for ease of description, such case is denoted as uncompensated incidence).

For example, the case that the compensated incidence is better than the uncompensated incidence may be that more light is incident into the eyebox after performing the compensation, resulting in higher brightness of the virtual image formed after performing the compensation, and/or, the light incident into the eyebox after performing the compensation is more uniform, resulting in better uniformity of the virtual image formed after performing the compensation, and/or, the contrast of the virtual image formed after performing the compensation is higher, but it is not limited to these cases.

For example, as compared with the imaging effect in the eyebox obtained by the refracted light which is finally formed by the light-source light in the case of assuming that no compensation adjustment is performed, the imaging effect obtained by the refracted light which is finally formed by the light-source light after performing the compensation adjustment is better; for example, the compensation adjustment improves at least one selected from the group consisting of imaging brightness, uniformity, and contrast.

Since the light-source light is obtained by performing the compensation adjustment on the initial light emitted by the light source in step S220, the light-source light obtained through compensation adjustment have relatively better brightness, so that the final imaging effect of the light-source light obtained through the compensation adjustment is better than the imaging effect without the compensation.

For example, the light incident surface of the refractor may be a flat plane and arranged parallel to the light exiting surface of the image source. The refractor arranged in this way is more conveniently mounted, and more easily positioned. Moreover, due to higher accuracy of relative positioning between the refractor and the image source, the plane type and/or the tilt angle, etc. of the formed virtual image can be more easily controlled and adjusted.

Or, the light incident surface of the refractor may be tilted relative to the light exiting surface of the image source, which is not limited.

Refractive indices at all positions of the refractor are the same, for example, the = indices at all positions of the refractor are greater than 1. Or, the indices in some different positions of the refractor are different.

In some cases, the distance between the light exiting surface and the light incident surface of the refractor gradually changes, for example, gradually increases, gradually decreases, or gradually decreases and then gradually increases again, etc., which is only illustrated in this embodiment, and it is not limited to the illustrated cases.

For example, the refractor is attached to the light exiting surface of the image source, that is, the above-described refractor 120 is attached to the light exiting surface of the image source component 130. For example, the refractor is arranged parallel to the image source and attached to the light exiting surface of the image source. Or the refractor is arranged parallel to the image source, and other optical elements for adjusting the light path are also arranged between the refractor and the image source. The refractor is indirectly attached to the light exiting surface of the image source through these optical elements, etc., which is not limited in the present disclosure; and description of the refractor and the image source component in the foregoing embodiments may be referred to for details.

For example, at least a part of the light incident surface of the refractor is spaced apart from at least a part of the light exiting surface of the image source.

For example, at least a part of the light incident surface of the refractor is spaced apart from at least a part of the light exiting surface of the image source. For example, a separation distance between the two is less than or equal to 50 mm, or the separation distance is less than or equal to 10 mm. If at least a part of the light incident surface of the refractor and at least a part of the light exiting surface of the image source are parallel to each other, then the separation distance between the two may be a distance between any corresponding positions of the two; or, if the two are relatively tilted, then the separation distance between the two may be the minimum separation distance or the maximum separation distance between the two, or a distance between certain selected positions of the two.

For example, in step S120 of the method 1000 and/or in step S220 of the method 2000, performing compensation adjustment on the initial light to obtain the light-source light includes: causing the light-source light obtained by performing the light compensation on the initial light to be incident into the light modulation layer.

For example, in step S120 of the method 1000 and/or in step S220 of the method 2000, causing the light-source light obtained by performing the light compensation on the initial light to be incident into the light modulation layer includes: causing the light-source light to have the first refraction, by causing the light-source light emitted by the light compensation component to be incident into different positions of the light incident surface of the light modulation layer with at least one refraction angle. The light-source light having the first refraction have a refraction angle, and the refraction angle is an included angle between the light-source light having the first refraction and the normal line of the light incident surface of the light modulation layer. For example, the refraction angle is an included angle between the chief light of the light-source light and the normal line of the light incident surface of the light modulation layer.

For example, by causing the light compensation component to deflect a set angle relative to a reference position, the chief light of the light-source light is incident into different positions of the light incident surface of the light modulation layer with at least one refraction angle. The reference position is an assuming position of the light compensation component where the light compensation component is parallel to the light modulation layer, or may also be considered as an assuming position of the light compensation component that causes the chief light of the light-source light is perpendicularly incident into the light modulation layer.

According to the above-described exemplary embodiment, by adjusting the angle between the light compensation component and the light modulation layer, the light-source light may have the first refraction, for example, the light-source light have the first refraction angle. The first refraction of the light-source light may at least partially offset the second refraction of the image light caused by the refractor.

For example, the first refraction angle and the second refraction angle formed by the second refraction generated by the image light after passing through the refractor have the same value, and have opposite refraction directions; so the initial first refraction angle of the light-source light may offset the second refraction angle of refraction caused by the refractor, so that the refracted light obtained by passing through the refractor may be exited along the set direction, to allow the refracted light to be incident into the eyebox, thereby achieving the objective of light compensation.

In the light source or the display device having the compensation function provided by the embodiment of the present disclosure, the light compensation component causes the initial light emitted by the light source to undergo the first refraction, to obtain the light-source light having the first refraction, so as to at least partially offset the second refraction of the image light caused by the refractor.

For example, the light compensation component includes at least one selected from the group consisting of a refraction layer, an eccentric Fresnel lens, and a reflective element. At least one selected from the group consisting of the refraction layer, the eccentric Fresnel lens, and the reflective element is configured to cause the initial light emitted by the light source component to undergo the first refraction so as to form the light source light emitted from the light compensation component.

For example, taking the case where the light compensation is performed by using the refraction layer as an example, in some examples, the light-source light emitted from at least some different positions on the light exiting surface of the refraction layer have different refraction angles.

For example, the refraction layer may receive and refract one or more initial light. By adjusting refraction angles in different positions of the refraction layer, the light-source light emitted from at least some different positions on the light exiting surface of the refraction layer have different refraction angles, which allows for targeted adjustment adapted to the light-source light at different positions, thereby improving the accuracy of light compensation.

For example, in some examples, the refraction layer includes a plurality of tooth-shaped refractive structures. The initial light emitted by the light source have the first refraction after passing through the tooth-shaped refractive structures, to form the light source light emitted from the light compensation component.

For example, the plurality of tooth-shaped refractive structures in the refraction layer can refract the light incident thereon, and tooth-shaped refractive structures at different positions can cause the light to refract with different angles; for example, by adjusting at least one selected from the group consisting of height, length, width, and refractive index of the tooth-shaped refractive structure, the angle of refraction of the incident light can be changed.

The refraction layer may further include a substrate. The plurality of tooth-shaped refractive structures are arranged on an upper surface of the substrate, and the initial light emitted by the light source have the first refraction after passing through the tooth-shaped refractive structures, to form the light-source light emitted from the light compensation component. For example, the tooth-shaped refractive structures correspond to at least part of the light-source light, so that different light-source light have different angles of refraction, but it is not limited this case.

The tilt angle and the height of the light exiting surface of the tooth-shaped refractive structure may be determined according to the required refraction angle, which is not be limited here.

For example, in step S120 of the method 1000 and/or in step S220 of the method 2000, the light compensation component includes an eccentric Fresnel lens. The initial light emitted by the light source undergo the first refraction through the eccentric Fresnel lens, to form the light source light emitted from the light compensation component.

A texture on a base surface of the eccentric Fresnel lens plays a refractive role on the light, and by adjusting the texture on the base surface of the eccentric Fresnel lens, the light can be refracted with the desired refraction angle after passing through the eccentric Fresnel lens.

For example, in step S120 of the method 1000 and/or in step S220 of the method 2000, the light compensation component includes a reflective element. The initial light emitted by the light source have the first refraction after passing through the reflective element, to form the light source light emitted from the light compensation component.

For example, the reflective element plays a role in changing the propagation direction of the light-source light. The reflective element reflects the initial light based on the light path reflection principle; and the light-source light formed by refracting the initial light is incident into different positions on the light incident surface of the light modulation layer with at least one refraction angle, so that the light-source light have the first refraction.

In at least one embodiment of the present disclosure, the reflective element includes a first sub-reflective element and a second sub-reflective element.

The first sub-reflective element is configured to reflect the incident initial light to the second sub-reflective element; the second sub-reflective element is configured to reflect the incident light, to cause the initial light to undergo the first refraction to form the light-source light having the first refraction. Positions and arrangement modes of the first sub-reflective element and the second sub-reflective element may be determined as needed, which will not be limited in this embodiment.

For example, in step S120 of the method 1000 and/or in step S220 of the method 2000, the shape of the light compensation component and the shape of the refractor have shapes are complementary, so that the first refraction of the light-source light at least partially offsets the second refraction of the image light caused by the refractor.

Since the shape of the light compensation component and the shape of the refractor have shapes are complementary, the first refraction and the second refraction of the light-source light can be at least partially offset, thereby achieving the objective of backlight compensation.

According to the above-described exemplary embodiments, in step S120 of the method 1000 and/or in step S220 of the method 2000, the refraction angle of the initial light emitted by the light source is changed by the light compensation component, so that the initial light undergoes the first refraction to form the light source light emitted from the light compensation component. In this way, the initial first refraction angle of the light-source light at least partially offset the second refraction angle of the light refracted after passing through the refractor, thereby achieving the objective of backlight compensation.

For example, in step S120 of the method 1000 and/or in step S220 of the method 2000, performing the compensation adjustment on the initial light further includes: causing the initial light emitted by the light source to be processed by the direction control member included in the light compensation component to form the light source light, and adjusting the propagation direction of the initial light through the direction control member, to realize the compensation adjustment. For example, the initial light emitted by the light source is the initial light emitted by the light emitting element of the light source, and the light emitting element is, for example, an electroluminescent element, for example, an OLED, but it is not limited to this case.

For example, in step S120 of the method 1000 and/or in step S220 of the method 2000, the direction control member includes a reflective wall configured to reflect the initial light, an extension direction of the reflective wall has a first tilt angle with the light exiting surface of the light modulation layer, so that the light-source light undergoes the first refraction to form the light-source light with the first refraction; and the light-source light is emitted from the light exiting surface of the light compensation component, for example, emitted to the image source component.

For example, the direction control member includes the reflective wall, and the reflective wall is configured to reflect the initial light emitted by the light source. The extension direction of the reflective wall has a second tilt angle with the light exiting surface of the light modulation layer, which may cause the initial light reflected by the reflective wall to undergo the first refraction to obtain the light source light. Thus, the light-source light is incident into different positions on the light incident surface of the image source component with at least one refraction angle, for example, incident into different positions on the light incident surface of the light modulation layer. In addition to adjusting the exiting direction of the light-source light, the reflective wall further has a light focusing function, which may avoid wasting light and improve brightness of the virtual image without increasing additional power.

Through the above-described exemplary embodiments, in the light compensating method used in the display device provided by the present disclosure, the compensation adjustment is performed on the light in the backlight path of the image source, so that the first refraction of the light at least partially offsets the second refraction of the light caused by the refractor, which alleviates the problem of the poor imaging effect of the virtual image viewed by the user due to failure of some light to be incident into the eyebox caused by the second refraction.

By performing the compensation adjustment on the backlight light of the image source, light that cannot be incident into the eyebox after being refracted by the refractor without compensation can be incident into the eyebox, that is, the incidence effect of the compensated refracted light relative to the eyebox is better than the incidence effect of refracted light relative to the eyebox generated in the case of assuming that no compensation adjustment is performed, which solves the above-described the problem of virtual image deviation, improves at least one selected from the group consisting of brightness, uniformity and contrast of the formed virtual image, and further improves the imaging effect.

At least one embodiment of the present disclosure further provides an image source, and the image source has a light compensation function, which may improve the imaging effect of the virtual image.

In at least one embodiment of the present disclosure, the image source provided by the present disclosure includes a light compensation component and a light modulation layer.

Hereinafter, the image source including the light compensation component and the display device provided by the embodiment of the present disclosure will be introduced in conjunction with the accompanying drawings.

Figure 27A:
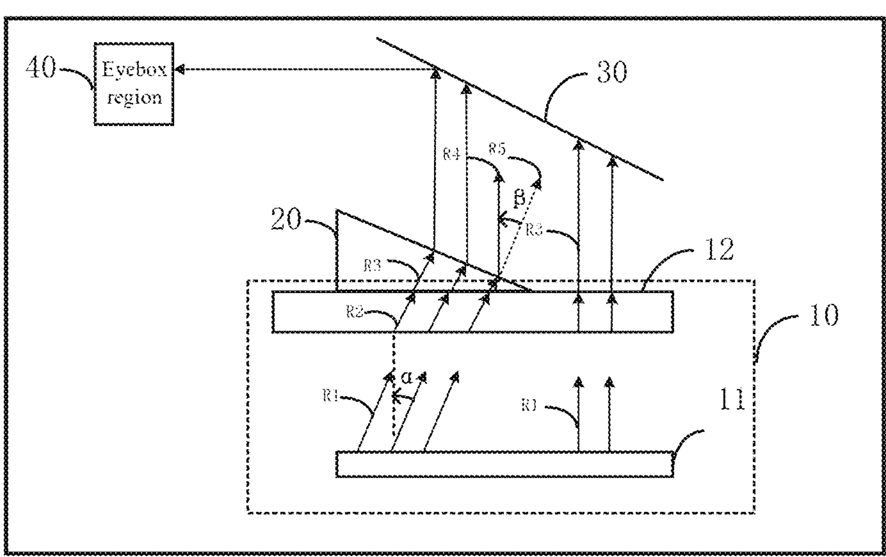
FIG. 27*a* shows a structural schematic diagram of an image source provided by an embodiment of the present disclosure.

Exemplarily, FIG. 27*a* shows a structural schematic diagram of the image source according to an exemplary embodiment of the present disclosure. Referring to FIG. 27*a*, the image source 10 includes a light compensation component 11 and a light modulation layer 12 (i.e., an imaging layer). The display device provided by at least one embodiment of the present disclosure includes the image source, and in the display device, the light compensation component 11 is configured to emit light-source light R1, the light modulation layer 12 is configured to convert the incident light-source light R1 into image light R2, and emit the image light R2 from the light exiting surface of the image source 10 to form image light R3; the light-source light R1 is incident into different positions on the light incident surface of the light modulation layer 12 with at least one refraction angle; and the refraction angle is an included angle between the light-source light and a normal line of the light incident surface of the light modulation layer 12.

In this way, the initial light emitted by the light source may undergo a first refraction through the light compensation component 11 to generate light-source light having the first refraction; the first refraction of the light-source light may at least partially offset a second refraction of the image light caused by the refractor 120, so that the image light used for forming a virtual image finally fall into a preset eyebox, thereby causing the virtual image to be located in a preset position that the user wants to see, compensating for virtual image deviation caused by the refractor 120, and reducing or avoiding virtual image deviation. The problem of virtual image deviation is a serious problem that greatly affects the user's viewing experience. If virtual image deviation is not compensated, the position of the virtual image (images of traffic signs, warning symbols, ground tips, etc.) the user sees may deviate from a preset ideal position, which even results in an incomplete virtual image with some information missing, and seriously affects driving experience and safety. Therefore, solving the problem is of great significance. Moreover, by using the light compensation component 11, the image light used for forming the virtual image finally fall into the preset eyebox, which can also improve at least one selected from the group consisting of brightness, uniformity and contrast of the formed virtual image.

For example, referring to FIG. 27*a*, the light compensation component 11 emits light-source light R1. The light compensation component 11 may include a portion emitting light based on the electroluminescence principle.

For example, the light compensation component 11 includes a light source, the light source may be an electroluminescent element such as a light emitting diode (LED), an organic light-emitting diode (OLED), a mini LED, a micro LED, a cold cathode fluorescent lamp (CCFL), cold LED light, electro luminescent (EL), a field emission display (FED) or a quantum dot (QD), and so on.

In at least one embodiment of the present disclosure, the light modulation layer 12 is configured to convert the incident light-source light R1 into image light R2.

For example, referring to FIG. 27*a*, after the light-source light R1 is incident into the light modulation layer 12, the light-source light R1 is converted into the image light R2 by the light modulation layer 12.

In some examples, an exiting angle of the image light R2 emitted from the light modulation layer 12 is the same as an incident angle of the light-source light R1 incident into the light modulation layer 12, but it is not limited to this case.

The light modulation layer 12 may include a liquid crystal panel; the liquid crystal panel causes the incident light-source light R1 to be formed into image light R2 for forming an image having at least a part of region with a preset pattern or without a pattern. The preset pattern may be any pattern that needs to be displayed, for example, a pattern with driving information such as navigation, fuel level, mileage, or the surrounding environment and road conditions of the driving vehicle, but it is not limited to this. The image light for forming an image without a pattern may be image light that display pure background colors.

In at least one embodiment of the present disclosure, the liquid crystal panel includes, but is not limited to, a thin film transistor liquid crystal panel, a twisted nematic liquid crystal panel, a multi-quadrant vertically aligned liquid crystal panel, an in-plane switching liquid crystal panel, or an advanced ultra-dimensional field conversion liquid crystal panel, etc.

In at least one embodiment of the present disclosure, the image light R2 is emitted from the light exiting surface of the image source 10. For ease of description, light emitted from the light exiting surface of the image source is referred to as image light R3.

In at least one embodiment of the present disclosure, the light-source light R1 emitted by the light compensation component is incident into different positions on the light incident surface of the light modulation layer 12 with at least one refraction angle.

The refraction angle may be an included angle between chief light of the light-source light R1 and a normal line of the light incident surface of the light modulation layer 12, for example, the first refraction angle α shown in FIG. 27*a*.

For example, the display device further includes a refractor 20, and the refractor 20 is configured to perform a refraction processing on at least part of the image light R3 and then emit refracted light R4.

For example, referring to FIG. 27*a*, a surface of the image source 10 is configured with a refractor 20, and at least part of the image light R3 is incident into the refractor 20, refracted after being processed by the refractor 20, and then emitted from the refractor 20.

In at least one embodiment of the present disclosure, the light incident surface of the refractor 20 may be a flat plane and arranged parallel to the light exiting surface of the light modulation layer 12. The refractor 20 arranged in this way is more conveniently mounted, and more easily positioned. Moreover, due to higher accuracy of relative positioning between the refractor 20 and the image source 10, the plane type and/or the tilt angle, etc. of the formed virtual image can be more easily controlled and adjusted.

Or, the light incident surface of the refractor 20 may be tilted relative to the light exiting surface of the image source; and the refractor 20 may be supported and fixed by a structure such as a support frame, which is not limited. Refractive indices in all positions of the refractor 20 may be the same or different; in some examples, the refractive indices in all positions of the refractor 20 are greater than 1, to adjust the optical distance of at least part of the image light R3, so that imaging distances at different positions of the formed virtual image are different. In some preferred examples, the imaging distances of the virtual image formed by the display device gradually change.

For example, the refractor 20 is attached to the light exiting surface of the image source 10. The attach may be direct attach or indirect attach through other structures. In the case where there is no gas medium between the light incident surface of the refractor 20 and the light exiting surface of the image source 10, it is considered that the refractor 20 is attached to the light exiting surface of the image source 10.

For example, referring to FIG. 27*a*, the refractor 20 is arranged parallel to the image source 10 and is attached to the light exiting surface of the image source 10.

Or the refractor 20 is arranged parallel to the image source 10, and other optical elements for adjusting the light path are also arranged between the refractor 20 and the image source 10. The refractor 20 is indirectly attached to the light exiting surface of the image source 10 through these optical elements, etc., which is not limited in the present disclosure.

For example, at least a part of the light incident surface of the refractor 20 is spaced apart from at least a part of the light exiting surface of the image source 10.

For example, a separation distance between at least a part of the light incident surface of the refractor 20 and at least a part of the light exiting surface of the image source 10 is less than or equal to 50 mm, or the separation distance between the two is less than or equal to 10 mm. If at least a part of the light incident surface of the refractor 20 and at least a part of the light exiting surface of the image source 10 are parallel to each other, the separation distance between the two may be a distance between any corresponding positions of the two; or, if the two are relatively tilted, the separation distance may be the minimum distance or the maximum distance between the two, or a distance between certain selected positions of the two.

In some cases, the distance between the light exiting surface and the light incident surface of the refractor 20 gradually changes, for example, gradually increases, gradually decreases, or gradually decreases and then gradually increases again, etc., which is only illustrated in this embodiment, and modes of illustration will not be limited.

For example, referring to FIG. 27*a*, the refractive index of the refractor 20 is greater than 1; and the distance between the light exiting surface of the refractor 20 and the light incident surface of the refractor 20 gradually decreases from left to right.

FIG. 27*a* only shows a structural schematic diagram of a refractor according to an exemplary embodiment of the present disclosure, and the present disclosure includes but is not limited to the refractor in the structure shown in FIG. 27*a*.

The refracted light R4 has the second refraction angle relative to its own un-refracted state in an assuming case where the refracted light R4 has not been refracted.

For example, referring to FIG. 27*a*, assuming the image light R3 forms light R5 without being refracted by the refractor 20 (i.e., in an un-refracted state), the image light R3 is refracted by the refractor 20 to form light R4 (the light R4 is also referred to as refracted light), and the light R4 has the second refraction angle relative to light R5, for example, the second refraction angle β in FIG. 27*a*.

Since the light-source light R1 emitted from the light compensation component 11 has the first refraction, the second refraction of the image light R3 after being processed by the refractor 20 can be at least partially offset, so that at least part of the image light R3 has a set exiting angle after undergoing the second refraction caused by the refractor 20. In other words, by adjusting the light through the first refraction and the second refraction, the light after passing through the refractor 20 can propagate along the set angle, so that this light can be incident into a target position in the eyebox.

For example, the set exiting angle may be an exiting angle of uncompensated light having not been refracted by the refractor 20, and the first refraction angle $\alpha$ of the light-source light can offset the second refraction angle $\beta$ of the image light caused by refraction of the refractor 20.

In this embodiment, there may be a conjugate relationship between the first refraction angle and the second refraction angle; and the conjugate relationship, for example, may be a relationship in which the first refraction angle and the second refraction angle have an equal value and opposite directions, but it is not limited to this case.

According to the above-described exemplary embodiment, by performing the compensation adjustment on the light in the backlight path of the image source, the light has the first refraction which can at least partially offset the second refraction of the image light caused by the refractor, so that finally light that meet the required exiting angle can be emitted.

For example, the display device further includes a reflective imaging portion 30; the reflective imaging portion 30 is configured to reflect the refracted light R5 incident into the reflective imaging portion 30 to the eyebox 40 of the display device, and the incidence effect of the refracted light relative to the eyebox 40 is better than the incidence effect of the refracted light generated in the case of assuming that the light-source light is perpendicularly incident onto the light incident surface of the light modulation layer relative to the eyebox. Here the "perpendicularly incident" refers to the case where the refraction angle does not exist, that is, the case where the refraction angle is zero.

For example, referring to FIG. 27*a*, the image source 10 is further configured with a reflective imaging portion 30 (e.g., a windshield of a vehicle) externally.

The refracted light R4 emitted from the refractor 20 is incident into the reflective imaging portion 30. The reflective imaging portion 30 reflects the incident refracted light R4 so that the refracted light R4 is incident into the eyebox 40.

For example, the eyebox 40 is a sight region of the user, allowing the user to see the virtual image formed by the refracted light within the sight region.

In at least one embodiment of the present disclosure, compensation adjustment is performed on the initial light emitted by the light source to obtain the light-source light R1, so that the incidence effect of the refracted light R4 formed by processing the light-source light R1 emitted from the light compensation component 11 through the refractor 20 relative to the eyebox 40 (for ease of description, the incidence is denoted as compensated incidence) is better than the incidence effect of the refracted light R3 relative to the eyebox 40 (for ease of description, the incidence is denoted as uncompensated incidence) generated in the case of assuming that the light-source light R1 is perpendicularly incident onto the light incident surface of the light modulation layer 12 (e.g., the incidence direction of the chief light of the light-source light R1 is perpendicular to the light incident surface of the light modulation layer 12).

Figure 27B:
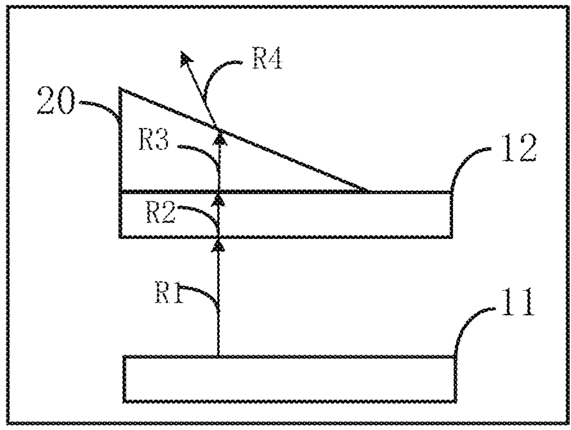
FIG. 27*b* shows a structural schematic diagram of an image source not being performed on a compensation processing.

FIG. 27*b* shows a structural schematic diagram of an uncompensated image source.

Referring to FIG. 27*b*, the incidence direction of the light-source light R1 emitted from the light compensation component 11 is perpendicular to the light incident surface of the light modulation layer 12. It may be seen from comparison between FIG. 27*a* and FIG. 27*b* that the uncompensated light-source light R1 finally undergo refraction by the refractor 20, resulting in the refraction of the uncompensated light-source light R1. In this way, part of the refracted light R4 cannot reach the eyebox 40.

Therefore, the case that the compensated incidence is better than the uncompensated incidence may be that more light is incident into the eyebox 40 after compensation, resulting in higher brightness of the virtual image formed after performing the compensation, and/or, light incident into the eyebox 40 after performing the compensation is more uniform, resulting in better uniformity of the virtual image formed after compensation, and/or, the contrast of the virtual image formed after performing the compensation is higher, but it is not limited to these cases.

For example, in an assuming case, an imaging effect in the eyebox 40 obtained by the refracted light R4 which is finally formed by the light-source light R1 obtained without performing the compensation adjustment on the initial light emitted by the light source is poor, for example, there is at least one of problems such as low brightness, poor imaging uniformity, and insufficient contrast; an imaging effect in the eyebox 40 obtained by the refracted light R4 which is finally formed by the light-source light R1 obtained by performing the compensation adjustment on the initial light emitted by the light source is better, which can avoid the problems of insufficient brightness, poor uniformity, or insufficient contrast in the formed image seen by the user caused by the reason that part of the light cannot reach the eyebox 40.

The light-source light R1 is obtained by performing the compensation adjustment on the initial light emitted by the light source, so that the light-source light R1 obtained through the compensation adjustment has relatively better brightness, and the final imaging effect of the light-source light R1 having been performed the compensation adjustment is better than the uncompensated imaging effect.

For example, the light compensation component 11 is configured to have a first angle relative to the light modulation layer 12, so that the light-source light R1 emitted by the light compensation component 11 is incident into different positions of the light incident surface of the light modulation layer 12 with at least one refraction angle. The light compensation component 11 has the refraction angle, and the refraction angle is an included angle between the light-source light R1 and the normal line of the light incident surface of the light modulation layer 12.

Figure 28:
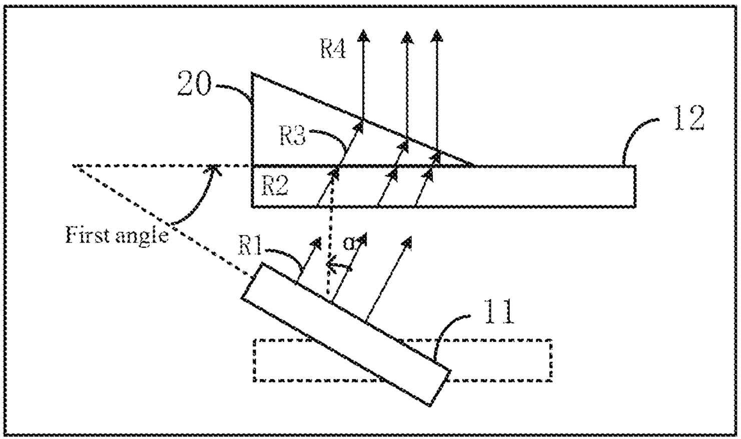
FIG. 28 shows another structural schematic diagram of an image source provided by the embodiment of the present disclosure.

FIG. 28 shows another structural schematic diagram of the image source according to the exemplary embodiment of the present disclosure.

For example, referring to FIG. 28, the light compensation component 11 is deflected by a set angle relative to a reference position (a position shown by a dashed line in the diagram), so that it is configured to have the first angle relative to the light incident surface of the light modulation layer 12.

In the case where the chief light of the light-source light R1 emitted from the light compensation component 11 is perpendicular to the light exiting surface of the light compensation component 11, since the light compensation component 11 has the first angle relative to the light incident surface of the light modulation layer 12, the chief light of the light-source light R1 has a certain refraction relative to the light incident surface of the light modulation layer 12, so as to be incident into different positions on the light incident surface of the light modulation layer 12 with at least one refraction angle.

In the case where the light compensation component 11 is not configured to have the first angle relative to the light modulation layer 12, for example, referring to FIG. 27*b*, the chief light of the light-source light R1 is incident into the light modulation layer 12 along a direction perpendicular to the light incident surface of the light modulation layer 12.

The light compensation component 11 is configured to have the first angle relative to the light modulation layer 12, for example, referring to FIG. 28, the chief light of the light-source light R1 is incident onto the light incident surface of the light modulation layer with at least one refraction angle.

The refraction angle (the angle $\alpha$ shown in the diagram) may be an included angle between the chief light of the light-source light R1 and the normal line of the light incident surface of the light modulation layer 12.

By adjusting the angle between the light compensation component 11 and the light modulation layer 12, the chief light of the light-source light R1 may be refracted relative to the light incident surface of the light modulation layer 12, and incident into different positions on the light incident surface of the light modulation layer 12 with at least one refraction angle, to undergo the first refraction.

The first refraction of the light-source light R1 can offset the second refraction of the image light R3 caused by the refractor 20.

For example, the first refraction angle $\alpha$ and the second refraction angle $\beta$ of the second refraction generated by the image light R3 after passing through the refractor 20 have the same value, and have opposite refraction directions; so the initial refraction angle of the light-source light R1 can offset the refraction angle caused by the refractor 20, so that the image light R3 may finally be emitted from the image source 10 with the set angle and reach the preset eyebox, thereby achieving the objective of light compensation, and achieving the above-described effects of reducing or avoiding virtual image deviation, and increasing brightness and contrast of the virtual image observed by the user.

For example, the light compensation component 111 includes a light source 1111 and a direction control member 1112, the direction control member 1112 is configured to perform at least one selected from the group consisting of convergence, diffusion, and collimation on the light-source light R1 with the first refraction obtained by processing the initial light emitted by the light source 1111.

The light source 1111 is configured to have a first tilt angle with the light incident surface of the light modulation layer 12, so that the light-source light R1 have the first refraction, or adjust the exiting direction of the direction control member 1112, so as to achieve the effect of refracting the initial light by the first refraction angle, so that the light-source light has the first refraction angle.

Figure 29:
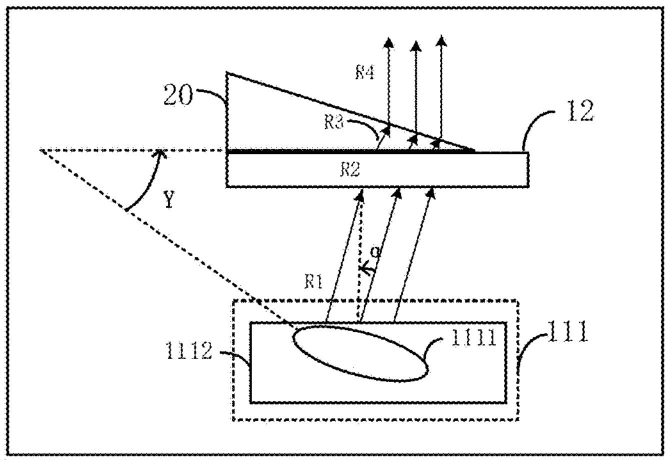
FIG. 29 shows another structural schematic diagram of an image source provided by the embodiment of the present disclosure.

With respect to the mode of adjusting the exiting direction of the light source 1111, FIG. 29 shows a structural schematic diagram of another image source according to the exemplary embodiment of the present disclosure. Referring to FIG. 29, the light source 1111 has a first tilt angle with the light modulation layer 12, for example, the first tilt angle Y in FIG. 29. Therefore, the light-source light R1 formed by processing the initial light emitted from the light source 1111 through the direction control member 1112 is incident into different positions on the light incident surface of the light modulation layer with at least one refraction angle, so that the light-source light R1 has the first refraction.

The refraction angle is an included angle between the chief light of the light-source light R1 and the normal line of the light incident surface of the light modulation layer 12, for example, the refraction angle includes the first refraction angle, for example, the first refraction angle $\alpha$ shown in FIG. 29.

Figure 30:
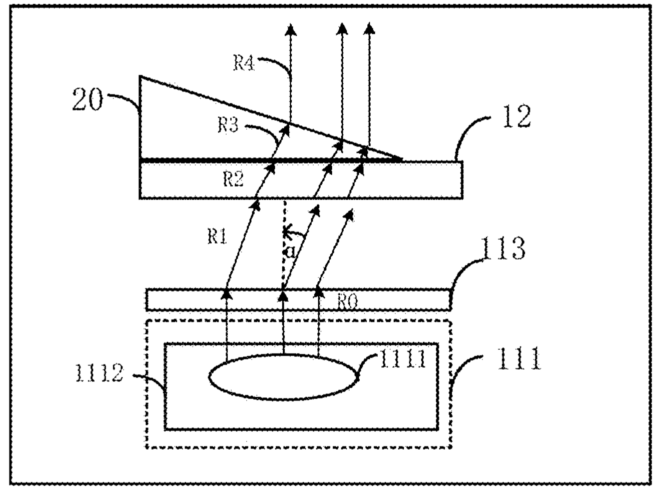
FIG. 30 shows another structural schematic diagram of an image source provided by the embodiment of the present disclosure.

With respect to the mode of adjusting the exiting direction of the direction control member 1112, FIG. 30 shows a structural schematic diagram of another image source according to the exemplary embodiment of the present disclosure. Referring to FIG. 30, the light compensation component 11 includes a light source component 111 and a light compensation member 113; the light source component 111 includes a light source 1111 and a direction control member 1112; the light source 1111 emits initial light R0, and the light compensation member 113 is configured to perform a light compensation processing on the initial light R0 incident thereon to obtain light-source light R1, so that the light-source light R1 is incident into different positions of the light incident surface of the light modulation layer 12 with at least one refraction angle, and the light-source light R1 has the first refraction; the chief light of the initial light R0 emitted by light source 1111 is perpendicular to the light incident surface of the direction control member 1112. The direction control member 1112 is configured to adjust the initial light R0 emitted by the light source 1111, and the adjustment includes at least one selected from the group consisting of convergence processing, diffusion processing, and collimation processing; the initial light R0 is converged and collimated by the direction control member 1112 and then emitted into the light compensation member 113. In some examples, the direction control member 1112 may include a reflective structure, for example, a reflective cup or a reflective piece; for example, the reflective cup is in one-to-one correspondence with the light source 1111, and the respective reflective cups adjust the initial light R0 emitted by the corresponding light source 1111.

In other examples, the direction control member 1112 further includes a reflective wall configured to reflect the initial light; and an extension direction of the reflective wall has a second tilt angle with the light incident surface of the light modulation layer 12, so that the light-source light R1 reflected through the reflective wall undergo the first refraction, but it is not limited to this case.

For example, referring to FIG. 30, the light compensation member 113 is arranged between the direction control member 1112 and the light modulation layer 12. Or, in other embodiments, the light compensation member is arranged between the light source component (including the light source capable of emitting light) and the direction control member, i.e., is located between the light source and the direction control member, light emitted by the light source is refracted by the light compensation member before being incident into the direction control member, and then undergoes at least one selected from the group consisting of convergence, diffusion, and collimation by the direction control member before being emitted. The processing on the light performed by the direction control member 1112 does not affect the refraction direction of the light-source light.

Figure 31:
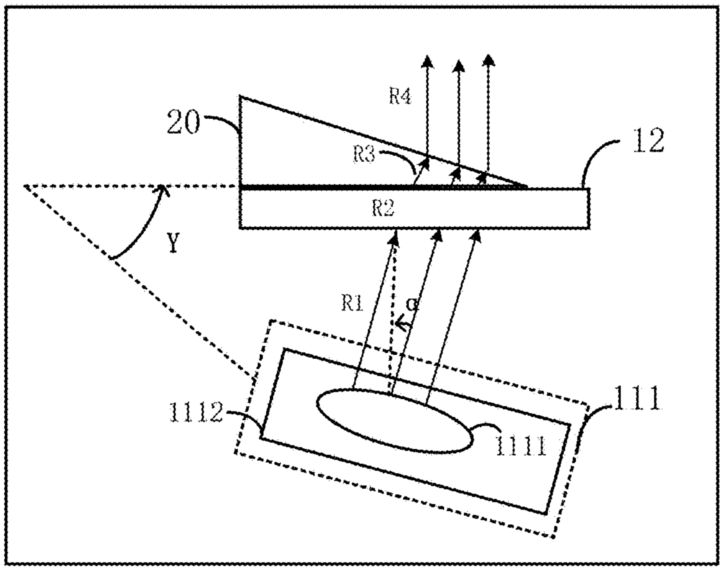
FIG. 31 shows another structural schematic diagram of an image source provided by the embodiment of the present disclosure.

FIG. 31 shows a structural schematic diagram of another image source according to the exemplary embodiment of the present disclosure.

For example, referring to FIG. 31, the reflective wall of the direction control member 1112 receives the initial light emitted by the light source 1111.

The extension direction of the reflective wall of the direction control member 1112 has a first tilt angle with the light modulation layer 12, for example, the first tilt angle Y in FIG. 31. Since the initial light of the light source 1111 is perpendicular to the direction control member 1112, the light-source light R1 formed by refracting the initial light emitted by the light source 1111 is incident into different positions on the light incident surface of the light modulation layer 12 with at least one refraction angle, so that the light-source light R1 has the first refraction.

The refraction angle is an included angle between the chief light of the light-source light R1 and the normal line of the light incident surface of the light modulation layer 12; for example, the refraction angle includes the first refraction angle, for example, the first refraction angle α shown in FIG. 31.

According to the above-described exemplary embodiment, by adjusting the tilt angle between the reflective wall of the direction control member 1112 and the light modulation layer 12, the exiting angle of the light source 1111 may be adjusted, so that the light-source light R1 has the first refraction.

For example, in addition to the modes of the foregoing examples, in some examples, the light source component may cooperate with the light compensation component to implement backlight compensation; in the case where the light compensation component is configured, the light source and the direction control member may perform compensatory refraction on the light, or may not perform compensatory refraction on the light, which is not limited.

Figure 32:
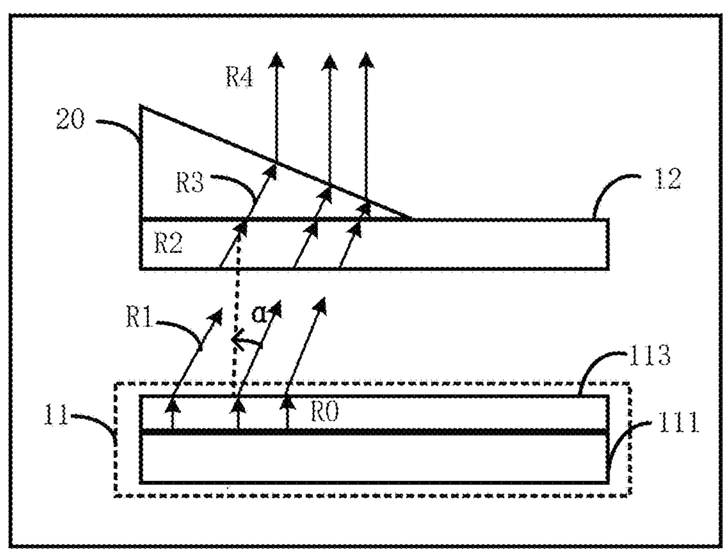
FIG. 32 shows another structural schematic diagram of an image source provided by the embodiment of the present disclosure.

In the example, FIG. 32 shows a structural schematic diagram of another image source according to an exemplary embodiment of the present disclosure. The light compensation component 11 includes a light source component 111 and a light compensation member 113, and the light source of the light source component 111 emits initial light R0. The light compensation member 113 is configured to perform a light compensation processing on the initial light R0 incident thereon to obtain the light-source light R1 emitted from the light compensation component 11, so that the light-source light R1 emitted from the light compensation component 11 is incident into different positions of the light incident surface of the light modulation layer 12 with at least one refraction angle, causing the light-source light R1 to have the first refraction. The refraction angle is an included angle between the light-source light R1 and the normal line of the light incident surface of the light modulation layer 12.

Referring to FIG. 32, the light compensation member 113 is arranged between the light source component 111 and the light modulation layer 12. For example, in other embodiments, in the case where the light compensation member is arranged between the light source component and the direction control member, the light emitted by the light source is refracted by the light compensation member before being incident into the direction control member, and then undergo at least one selected from the group consisting of convergence, diffusion, and collimation by the direction control member before being emitted. The processing on the light performed by the direction control member does not affect the refraction direction of the light-source light.

For example, the light compensation member 113 includes at least one selected from the group consisting of a refraction layer, an eccentric Fresnel lens, and a reflective element. At least one selected from the group consisting of the refraction layer, the eccentric Fresnel lens, and the reflective element is configured to cause the initial light-source light emitted by the light source to undergo the first refraction, to form the light-source light.

For example, the texture on a base surface of the eccentric Fresnel lens plays a refractive role on the light; by adjusting the texture on the base surface of the eccentric Fresnel lens, the light can be refracted with the desired refraction angle after passing through the eccentric Fresnel lens.

For example, the light compensation member 113 is configured to refract the initial light R0 emitted by the light source 111 to obtain the light-source light R1, so that the light-source light R1 is incident into different positions of the light incident surface of the light modulation layer 12 with at least one refraction angle after passing through the light compensation member 113.

Figure 33A:
FIG. 33*a* shows a structural schematic diagram of a refraction layer provided by the embodiment of the present disclosure.
Figure 33A:
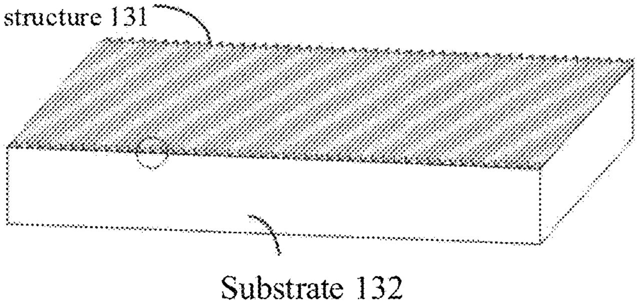

FIG. 33*a* shows a structural schematic diagram of the refraction layer provided by at least one embodiment of the present disclosure.

For example, referring to FIG. 33*a*, the refraction layer includes a plurality of tooth-shaped refractive structures 131. The light-source light R1 emitted by the above-described light source component 11 undergo the first refraction after passing through the tooth-shaped refractive structures 131.

Referring to FIG. 33*a*, the plurality of tooth-shaped refractive structures 131 of the refraction layer may refract the light incident thereon, tooth-shaped refractive structures 131 at different positions may cause the light to be refracted with different angles; for example, by adjusting at least one selected from the group consisting of height, length, width, and refractive index of the tooth-shaped refractive structures 131, the refraction angle of the incident light can be changed.

In some other embodiments, included angles between the second incident surface and the second exiting surface at different positions of the tooth-shaped refractive structure 131 may also be set to be the same, so that the incident initial light can undergo refraction with the same refraction angle, that is, all the light source light emitted from the refraction layer has the same refraction angle.

Referring to FIG. 33*a*, the refraction layer may further include a substrate 132. The plurality of tooth-shaped refractive structures 131 are arranged on an upper surface of the substrate 132, and the initial light R0 emitted by the above-described light source component 111 has the first refraction after passing through the tooth-shaped refractive structures 131, to generate light-source light R1 with the first refraction.

Figure 33B:
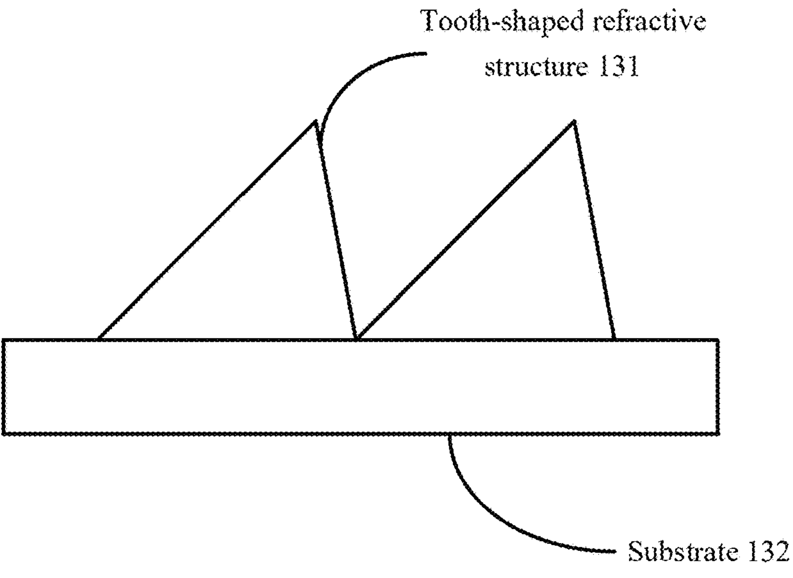
FIG. 33*b* shows an enlarged schematic diagram of a tooth-shaped refractive structure provided by the embodiment of the present disclosure.

In order to have clearer understanding of the shape of the tooth-shaped refractive structure, a portion shown in a circle in FIG. 33*a* is enlarged and presented in FIG. 33*b*.

FIG. 33*b* shows an enlarged schematic diagram of the tooth-shaped refractive structure provided by at least one embodiment of the present disclosure. Referring to FIG. 33*b*, the tooth-shaped refractive structure 131 has a certain tilt angle and height. The tilt angle and the height of the light exiting surface of the tooth-shaped refractive structure 131 may be determined according to the required refraction angle, which are not limited.

For example, taking the case where the light compensation is performed by using the refraction layer as an example, in some examples, the light source light emitted from at least some different positions on the light exiting surface of the refraction layer has different refraction angles.

For example, the refraction layer may receive and refract one or more initial light rays. By adjusting refraction angles generated on the light at different positions of the refraction layer, the light-source light emitted from at least some different positions of the light exiting surface of the refraction layer has different refraction angles, which allows for targeted adjustment adapted to the light-source light in different positions, thereby improving the accuracy of light compensation.

For example, the light compensation component includes a reflective element. The initial light R0 emitted by the light source component 111 has the first refraction after passing through the reflective element.

For example, the reflective element has a function of changing the propagation direction of the initial light R0 emitted by the light source. The reflective element refracts the light-source light based on the light path reflection principle, and the light-source light obtained by refracting the initial light R0 is incident into different positions of the light incident surface of the light modulation layer 12 with at least one refraction angle, so that the light-source light R1 has the first refraction.

For example, the reflective element includes a first sub-reflective element 113*a* and a second sub-reflective element 113*b*. The first sub-reflective element 113*a* is configured to reflect the initial light R0 emitted by the incident light source to the second sub-reflective element 113*b*; the second sub-reflective element 113*b* is configured to reflect the incident initial light R0 (i.e., the light from the first sub-reflective element), to cause the initial light R0 to undergo the first refraction, to form the light-source light having the first refraction.

Figure 34:
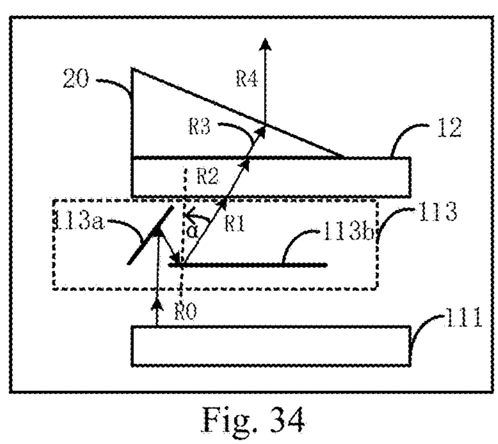
FIG. 34 shows another structural schematic diagram of an image source provided by the embodiment of the present disclosure.

FIG. 34 shows another structural schematic diagram of the image source provided by at least one embodiment of the present disclosure.

For example, referring to FIG. 34, the reflective element includes a first sub-reflective element 113*a* and a second sub-reflective element 113*b*. By arranging light path positions of the first sub-reflective element 113*a* and the second sub-reflective element 113*b*, the first sub-reflective element 113*a* receives the initial light R0 emitted by the light source component 111 and reflects the initial light R0 to the second sub-reflective element 113*b*.

The second sub-reflective element 113*b* receives and reflects the initial light R0 reflected by the first sub-reflective element 113*a*, so that the initial light R0 undergo light path refraction relative to the initial light-source light, to obtain the light-source light R1, and the light-source light R1 is incident into different positions of the light incident surface of the light modulation layer 12 with at least one refraction angle, so that the light-source light R1 has the first refraction. Positions and the arrangement modes of the first sub-reflective element 113*a* and the second sub-reflective element 113*b* may be determined as needed, which are not limited in this embodiment.

For example, the shape of the light compensation member 113 and the shape of the refractor 20 are complementary, so that the first refraction of the light-source light R1 at least partially offsets the second refraction of the image light R3 caused by the refractor 20.

Figure 35:
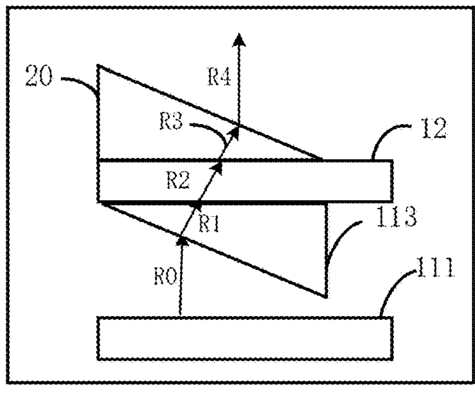
FIG. 35 shows another structural schematic diagram of an image source provided by the embodiment of the present disclosure.

FIG. 35 shows a structural schematic diagram of another image source provided by at least one embodiment of the present disclosure.

Since the shape of the light compensation member 113 and the shape of the refractor 20 are complementary, so that the first refraction of the light-source light R1 at least partially offsets the second refraction caused by the refractor, thus the image light R3 can be emitted at a set angle, thereby achieving the objective of backlight compensation.

In addition to the modes of the foregoing examples, in the embodiment of the present disclosure, another type of light compensation member may also be arranged in the image source to implement refraction of the light-source light; in the case where the light compensation member is provided, the light source and the direction control member may refract the light-source light, or may not refract the light-source light, which is not limited. Hereinafter, the image source including the light compensation member according to the embodiment of the present disclosure will be described in detail in combination with FIG. 36.

Figure 36:
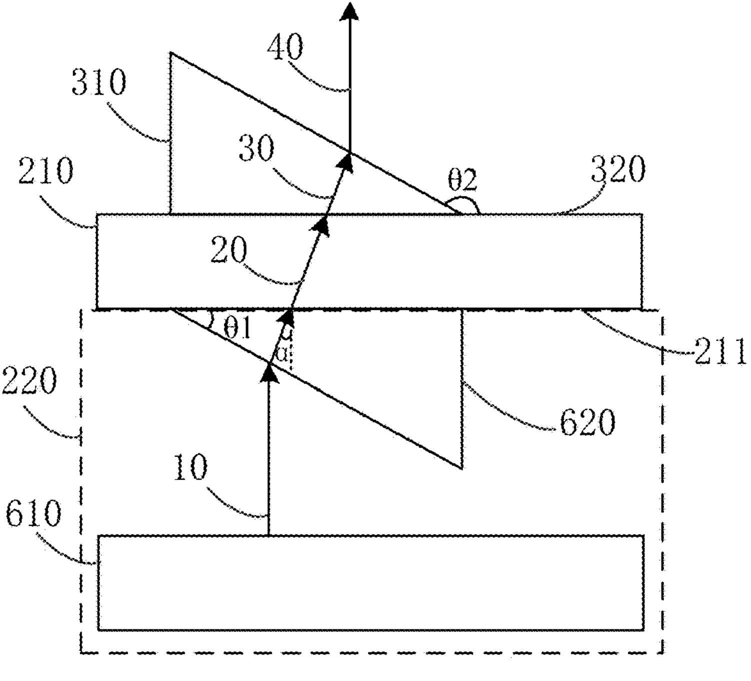
FIG. 36 shows another structural schematic diagram of an image source provided by the embodiment of the present disclosure.

FIG. 36 shows a schematic diagram of an image source including a light compensation member provided by another embodiment of the present disclosure. As shown in FIG. 36, the image source according to the embodiment of the present disclosure may include an imaging layer 210 (equivalent to the light modulation layer according to the foregoing embodiment) and a light source portion 220 (shown in a dashed box), the light source portion 220 may include a light source component 610 and a light compensation member 620; the light source component 610 may be used for emitting initial light 10, and the light compensation member 620 may refract at least part of the initial light 10 to obtain light-source light with the refraction angle α. The light compensation member 620 may be arranged between the light source component 610 and the imaging layer 210, or may also be arranged inside the light source component 610.

In some embodiments, the light source component 610 may include at least one of electroluminescent elements such as a light emitting diode (LED), an organic light-emitting diode (OLED), a mini LED, a micro LED, a cold cathode fluorescent lamp (CCFL), cold LED light, electro luminescent (EL), a field emission display (FED) or a quantum dot (QD), and so on, or may also include, for example, an RGB three primary color laser module and a microelectromechanical system (MEMS) in laser beam scanning (LBS) technology, etc. In some embodiments, the light source component 610 may include a light source and a light processing member; the light source is used for emitting initial light; the light processing member is configured to adjust the initial light emitted by the light source to obtain light-source light with the refraction angle; the adjustment includes at least one selected from the group consisting of convergence processing, diffusion processing, and collimation processing; the light compensation member 620 may be arranged between the light source and the light processing member (i.e., the above-described direction control member); or, the light compensation member 620 may be arranged between the light processing member and the imaging layer 210.

In the case where the light compensation member 620 is arranged between the light processing member and the imaging layer 210, light emitted by the light processing member is refracted by the light compensation member 620 and then incident onto the imaging layer 210 to achieve the objective of backlight compensation. In the case where the light compensation member 620 is arranged between the light source and the light processing member, the light emitted by the light source is refracted by the light compensation member 620 before being incident onto the light processing member, and then subjected to at least one selected from the group consisting of convergence processing, diffusion processing and collimation processing by the light processing member before being emitted. The processing on the light performed by the light processing member does not affect the refraction direction of the light-source light.

In some embodiments, the light processing member may not change the propagation direction of the initial light; and the light compensation member 620 is configured to refract the initial light. In some other embodiments, the light processing member may be configured to change the propagation direction of the initial light, thereby eliminating the need for a light compensation member. In still other embodiments, both the light processing member and the light compensation member may be arranged as needed to change the propagation direction of the initial light, to meet, for example, application requirements such as the light-source light obtained from a plurality of paths of initial light being incident into the imaging layer with different refraction angles.

In some other embodiments, the light compensation member 620 may be arranged close to the light incident surface 211 of the imaging layer 210. In still other embodiments, the light compensation member 620 may be arranged in contact with the light incident surface 211 of the imaging layer 210, or not in contact with the light incident surface 211 of the imaging layer 210. In some embodiments, the light compensation member 620 may also be arranged close to the light source component 610, and may be in contact or not in contact with the light source component 610.

In some embodiments, the imaging layer 210 may be configured to convert the light-source light incident thereon into image light 20, and emit image light 20 from the light exiting surface 320 of the imaging layer 210 as the image light 30; the light-source light may be incident into different positions on the light incident surface 211 of the imaging layer 210 with at least one refraction angle. For ease of description, the light propagating in the imaging layer 210 is referred to as the image light 20, which may be understood as an intermediate state in which the light-source light is converted into the image light 30. In some other embodiments, the imaging layer 210 may be configured to not change the propagation direction of the incident light-source light, i.e., the image light 30 emitted from the light exiting surface 320 of the imaging layer 210 has a propagation direction substantially the same as that of the light-source light incident to the imaging layer 210.

In still other embodiments, the shape of the light compensation member 620 and the shape of the refractor 310 are complementary. Specifically, in the case where the image source according to the embodiment of the present disclosure is applied to a display device including the refractor 310, the shape of the light compensation member 620 may be determined according to the shape of the refractor 310, especially the shape of the exiting surface of the refractor 310. Here, the feature related to that the shapes are complementary may be understood as that the shape of the incident surface of the light compensation member 620 and the shape of the exiting surface of the refractor 310 are complementary.

For example, in the case where the exiting surface of the refractor 310 is a tilted plane, a first included angle θ1 between the incident surface of the light compensation member 620 and the light incident surface 211 of the imaging layer 210 and a second included angle θ2 between the exiting surface of the refractor 310 and the light exiting surface 320 of the imaging layer 210 may be complementary. For another example, in the case where the exiting surface of the refractor 310 is a curved surface, the first included angle θ1 between tangent lines in respective positions on the incident surface of the light compensation member 620 and the light incident surface 211 and the second included angle θ2 between tangent lines in corresponding positions on the exiting surface of the refractor 310 and the light exiting surface 320 are complementary. Here the corresponding position may be a certain position on the exiting surface of the refractor 310 which is passed through by the same path of light that passes through the corresponding position on the incident surface of the light compensation member 620. In some embodiments, refractive indices of the light compensation member 620 and the refractor 310 may be the same. The term "complementary" may be understood as that after the light passes through the light compensation member 620 and the refractor 310, the light incident into the light compensation member 620 is parallel to the light emitted from the refractor. In some other embodiments, the shape of the exiting surface of the refractor 310 and the shape of the incident surface of the light compensation member 620 can enable the two surfaces to be attached together, and the refractor 310 and the light compensation member 620 may be combined into a rectangular body after the above-mentioned two surfaces are attached together.

As further shown in FIG. 36, the initial light 10 undergo refraction with a refraction angle α when passing through the light compensation member 620, forming the refracted light-source light which is incident onto the light incident surface 211 of the imaging layer 210, and then is emitted as the image light 30 from the light exiting surface 320 of the imaging layer 210. Since the image light 30 has the refraction angle, additional refraction caused by the refractor 310 may be at least partially offset. It may be seen that in the case where the shape of the light compensation member 620 is set to be complementary to the shape of the refractor 310, the additional refraction caused by the refractor 310 may be completely or approximately offset by using the refraction effect of the light compensation member 620, so that the refracted light 40 may be emitted with the desired exiting angle (e.g., perpendicular to the light exiting surface 320) generated in the case where the refractor 310 and the light compensation member 620 are not arranged, to achieve the objective of backlight compensation and improving the imaging effect.

The above provides exemplary illustration of the image source including the light compensation member according to the embodiment of the present disclosure in conjunction with FIG. 36; it may be understood that the light compensation member 620 shown in the diagram is exemplary rather than limitative. For example, in some embodiments, the light compensation member may include at least one selected from the group consisting of a refraction layer, a Fresnel lens, and a reflective element, etc. In some other embodiments, the light compensation member 620 may be implemented in the form of a Fresnel lens; a texture on a base surface of the Fresnel lens plays a refractive role on the light; by adjusting the texture on the base surface of the Fresnel lens, the light may be refracted with the desired refraction angle after passing through the Fresnel lens. In still other embodiments, the Fresnel lens may be an eccentric Fresnel lens.

At least one embodiment of the present disclosure further provides a head up display apparatus, and the head up display apparatus includes any one of the image sources provided by the embodiments of the present disclosure or any one of the display devices provided by the embodiment of the present disclosure.

At least one embodiment of the present disclosure further provides a transportation equipment, and the transportation equipment includes any one of the head up display devices provided by the embodiments of the present disclosure. The transportation equipment may be various suitable transportation tools, for example, automobiles, construction vehicles, ships, or airplanes, etc.

The head up display apparatus provided by the embodiment of the present disclosure has the technical effect of any one of the image sources provided by the embodiments of the present disclosure or any one of the display devices provided by the embodiments of the present disclosure.

The image source, the display device, the head up display apparatus, and the transportation equipment including the refractor provided by the embodiments of the present disclosure may adapt to needs of the application environment, so that the imaging distances of the contents displayed on the virtual image can match the distances of the environmental objects relative to the user, so as to achieve the effect of the virtual image display contents being closely fitted to the environmental objects at all time, which can better fuse the image with the external physical objects, obtain a better visual effect, and improve use experience provided by the display device to the user.

According to the image source including the light compensation component, the display device, the head up display apparatus, and the transportation equipment provided by the embodiments of the present disclosure, by performing compensation adjustment on the initial light emitted by the light source component, the light-source light with the first refraction is obtained, so that the first refraction of the light-source light at least partially offsets the second refraction of the image light caused by the refractor, to reduce light path loss caused by the second refraction, thereby realizing light compensation and improving the imaging effect of the display device. Moreover, by performing compensation adjustment on the initial light, the incidence effect of light relative to the eyebox may be better than the incidence effect of light relative to the eyebox generated in the case of assuming that no compensation adjustment is performed, thereby enhancing the imaging effect.

The above descriptions are merely exemplary or preferred embodiments of the present disclosure, and are not used to limit the protection scope of the present disclosure; although the present disclosure is explained in detail with reference to the foregoing embodiments, those ordinarily skilled in the art will readily appreciate that many modifications are possible in the technical solutions recorded in the respective foregoing embodiments, or equivalent substitutions are made for part of technical features. Any modification, equivalent substitution, improvement, and the like, made within the spirit and principles of the present disclosure should be covered within the protection scope of the present disclosure. The scope of protection of the present disclosure is determined according to the scope defined in the claims.

The invention claimed is:

1. A display device, comprising:

an image source component, configured to emit image light;

a refractor, arranged on a light exiting side of the image source component, and configured to change an optical distance of at least a part of the image light, so as to change an image distance of at least a part of a virtual image formed by the image light; and a processing portion, arranged on a light exiting side of the refractor, and configured to enable at least part of the image light to propagate to the eyebox, wherein the at least part of the image light processed by the processing portion comprises refracted light formed by the image light which is emitted by the image source component and then emitted from the refractor;

the display device comprises an image source, the image source comprises the image source component and a light compensation component, and the image source component comprises a light modulation layer;

the light compensation component is configured to emit light-source light, the light-source light is incident into the light modulation layer, and the light modulation layer is configured to convert the incident light-source light into the image light;

the light compensation component is configured to cause the light-source light to be incident onto a light incident surface of the light modulation layer with at least one refraction angle; and the refraction angle is an included angle between the light-source light and a normal line of the light incident surface of the light modulation layer;

the image source is configured to perform light compensation on the display device, and the refractor is configured to refract the image light and then emit the refracted light;

a first refraction of the light-source light emitted by the light compensation component at least partially offsets a second refraction of the image light caused by the refractor.

2. The display device according to claim 1, wherein refracted light emitted from different positions of at least part of the light exiting surface of the refractor have different optical distances within the refractor, so that the image distance of at least a part of the virtual image formed by the image light is changed.

3. The display device according to claim 1, wherein the processing portion comprises an amplifier component, and the amplifier component is configured to process the refracted light to amplify the virtual image.

4. The display device according to claim 3, wherein the refractor is a tilt angle adjustment type refractor and/or an image face shape adjustment type refractor;

the processing portion further comprises a reflective imaging portion, amplified light obtained by processing the refracted light through the amplifier component is reflected by the reflective imaging portion to the eyebox to form the virtual image, and the amplified light is reflected by the reflective imaging portion to form a reference image assuming that no refractor is provided;

the reference image has a first included angle with a horizontal direction, the virtual image has a second included angle with the horizontal direction, and a value of the second included angle is different from a value of the first included angle; and/or, the reference image is in a first image face shape, the refractor is configured to cause the virtual image to be in a second image face shape, and the second image face shape is different from the first image face shape; the first image face shape is a flat face, and the second image face shape is a flat face or a curved face, or, the first image face shape is a curved face, and the second image face shape is a flat face or a curved face.

5. The display device according to claim 4, wherein at least a part of a light exiting surface of the tilt angle adjustment type refractor is a flat face; and/or, a light exiting surface of the image face shape adjustment type refractor is a flat face or a curved face.

6. The display device according to claim 3, wherein the display device is configured to allow a user to see at least one naked eye 3D virtual image through amplified light which is formed after the refracted light is processed by the amplifier component for imaging; or, the display device is configured to allow the user to observe a plurality of virtual images at a same moment or at different moments through an eyebox of the display device, wherein at least one virtual image among the plurality of virtual images is an image formed by amplified light which is formed after the refracted light is processed by the amplifier component, and/or, the display device is configured to allow the user to see at least one naked eye 3D virtual image through at least one virtual image among the plurality of virtual images.

7. The display device according to claim 3, wherein the refracted light is processed through the amplifier component to form amplified light, an optical distance within the refractor of the image light emitted from different positions of at least part of the light exiting surface of the refractor has an association relationship with a change of the virtual image formed by the amplified light relative to a reference image, and the reference image is an image formed by the amplified light obtained by processing the image light emitted by the image source component through the amplifier component assuming that no refractor is provided.

8. The display device according to claim 1, wherein a light incident surface of the refractor is a flat face, and a light exiting surface of the refractor is a flat face or a curved face;

a thickness of at least a part of the refractor gradually changes along at least one direction, and/or a refractive index of at least a part of the refractor gradually changes along at least one direction.

9. The display device according to claim 1, wherein a refractive index of the refractor is greater than that of air;

refractive indices at all positions of the refractor are the same, or a difference between a maximum refractive index and a minimum refractive index of the refractor is less than a preset threshold;

the refractor has a light incident surface and a light exiting surface, and a distance from each of different positions on the light exiting surface of the refractor to a corresponding position on the light incident surface of the refractor match the image distance of a corresponding positions in the virtual image.

10. The display device according to claim 1, wherein a thickness and/or a refractive index of the refractor gradually change along a direction from one side of the refractor to other side of the refractor;

and/or, the thickness and/or the refractive index of the refractor gradually change along a direction from a middle region of the refractor to an edge of the refractor.

11. The display device according to claim 1, wherein the display device is configured to allow the user to observe a plurality of virtual images through an eyebox of the display device at a same moment or at different moments;

at least two virtual images among the plurality of virtual images have different distances to the eyebox, at least one virtual image of the at least two virtual images is perpendicular to the horizontal direction, another virtual image of the at least two virtual images has an included angle greater than or less than 90 degrees with the horizontal direction, the horizontal direction is a direction perpendicular to a plane on which the eyebox is located, or a direction parallel to a ground on which a transportation equipment adopting the display device travels in real time.

12. The display device according to claim 1, wherein the refractor covers at least a part of a light exiting surface of the image source component, and at least a part of the refractor is attached to the light exiting surface of the image source component; or, a transparent protective element is provided between at least a part of the refractor and the light exiting surface of the image source component.

13. The display device according to claim 12, wherein in a case where a transparent protective element is provided between at least a part of the refractor and the light exiting surface of the image source component, the refractor is fixedly arranged on a light exiting surface of the transparent protective element, the image source component comprises a display panel, and the display panel is attached to a light incident surface of the transparent protective element;

a bottom face of the display panel facing the transparent protective element is suspended, or, a bottom face of the display panel facing the transparent protective element is provided with a stress buffering structure.

14. The display device according to claim 1, wherein the refractor covers a part of the image source component;

a thickness of the refractor gradually decreases or gradually increases in a direction from a portion of the image source component that is covered by the refractor to a portion of the image source component that is not covered by the refractor, or, a refractive index of the refractor gradually increases or gradually decreases in a direction from the portion of the image source component that is covered by the refractor to the portion of the image source component that is not covered by the refractor.

15. The display device according to claim 1, wherein the image source component comprises an image source display, at least part of the image light emitted by the image source display is incident into the refractor, or, the image source component comprises at least two image source displays, and at least part of the image light emitted by the at least two image source displays is incident into the refractor.

16. A head up display apparatus, comprising the display device according to claim 1.

17. A transportation equipment, comprising the head up display apparatus according to claim 16.

* * * * *